(12) United States Patent
Uchino et al.

(10) Patent No.: US 6,677,411 B2
(45) Date of Patent: Jan. 13, 2004

(54) COMPONENT OF CATALYST FOR OLEFIN POLYMERIZATION

(75) Inventors: Hideshi Uchino, Mie (JP); Hiroshi Nakano, Mie (JP); Shuuichi Toriu, Mie (JP); Takao Tayano, Mie (JP); Hirotugu Niwa, Mie (JP); Yoshiyuki Ishihama, Mie (JP); Toshihiko Sugano, Mie (JP)

(73) Assignee: Japan Polychem Corporation, Tokyo (JP)

(*) Notice: Subject to any disclaimer, the term of this patent is extended or adjusted under 35 U.S.C. 154(b) by 16 days.

(21) Appl. No.: 10/111,408

(22) PCT Filed: Jul. 26, 2001

(86) PCT No.: PCT/JP01/06459

§ 371 (c)(1),
(2), (4) Date: May 6, 2002

(87) PCT Pub. No.: WO02/22693

PCT Pub. Date: Mar. 21, 2002

(65) Prior Publication Data

US 2003/0027950 A1 Feb. 6, 2003

(30) Foreign Application Priority Data

Sep. 13, 2000 (JP) .................................. 2000-277640
Mar. 16, 2001 (JP) .................................. 2001-075412
Apr. 9, 2001 (JP) .................................. 2001-109549

(51) Int. Cl.$^7$ ............................. C08F 4/02; C08F 4/642; B01J 21/16
(52) U.S. Cl. .................. 526/127; 526/126; 526/154; 526/155; 526/160; 526/943; 502/62; 502/80; 502/84
(58) Field of Search ................. 526/126, 154, 526/127, 155, 160, 943; 502/62, 80, 84

(56) References Cited

U.S. PATENT DOCUMENTS 6,344,530 B2 * 2/2002 Sugano et al. .............. 526/160
6,531,552 B2 * 3/2003 Nakano et al. .............. 526/127

FOREIGN PATENT DOCUMENTS

| EP | 683180 | 11/1995 |
| EP | 0 511 665 | 7/1998 |
| JP | 5-295022 | 11/1993 |
| JP | 7-309907 | 11/1995 |
| JP | 2000-1310 | 1/2000 |
| JP | 2000-80117 | 3/2000 |
| JP | 2001-31720 | 2/2001 |

OTHER PUBLICATIONS

U.S. patent application Ser. No. 09/756,775 Jan. 10, 2001.

* cited by examiner

Primary Examiner—Tom Dunn
Assistant Examiner—Christina Ildebrando
(74) Attorney, Agent, or Firm—Oblon, Spivak, McClelland, Maier & Neustadt, P.C.

(57) ABSTRACT

A catalyst component for olefin polymerization, which comprises an ion-exchange layered silicate having the following features 1 and 2:

feature 1: in a pore size distribution curve calculated from desorption isotherm by nitrogen adsorption-desorption method, a pore diameter $D_m$ showing a maximum peak intensity $D_{VM}$ is from 60 to 200 Å; and feature 2: in a pore size distribution curve calculated from desorption isotherm by nitrogen adsorption-desorption method, a pore diameter $D_{m1/2}$ (Å) on the smaller pore size side corresponding to a ½ peak intensity of the maximum peak intensity $D_{VM}$ has a relation of $D_{m1/2}/D_m$ of at least 0.65 and less than 1, provided that the largest value is employed when there are a plurality of $D_{m1/2}$ values.

14 Claims, 5 Drawing Sheets

COMPONENT OF CATALYST FOR OLEFIN POLYMERIZATION

The present invention relates to a catalyst component for olefin polymerization, a catalyst and a process for producing polyolefin using said-catalyst. Particularly, the present invention provides an olefin polymerization catalyst having a high activity and having an ability of stably producing polyolefin without fouling on a polymerization reactor wall and the like by using an ion-exchange layered silicate having a specific structure. Further, the present invention provides a prepolymerization catalyst homogeneously prepolymerized, which has excellent powder properties and does not produce a residue of the catalyst leading to degradation of an outer appearance of a product.

BACKGROUND ART

A metallocene catalyst for olefin polymerization comprises a metallocene complex and a cocatalyst activating the metallocene complex. As the above cocatalyst, various compounds such as methyl aluminoxane, boron type compounds or the like have been proposed. In the production of polyolefin using a specific process, it is required to have a metallocene catalyst supported on a carrier in view of process properties and handling properties of polymer particles produced therefrom. Since a metallocene catalyst used by combining well known methyl aluminoxane and boron type compounds is often soluble in an organic solvent, it is used by being supported on an inorganic carrier such as silica or an organic carrier such as an organic polymer.

Also, a cocatalyst other than these cocatalysts has been reported. EP511665 discloses an example of producing an olefin polymer by using clay or clay mineral as an olefin polymerization catalyst component and combining it with a metallocene catalyst. In this catalyst system, the carrier is characterized by having a function of a cocatalyst activating the metallocene catalyst. Also, it is reported that an olefin polymerization activity is improved by using an ion-exchange layered compound treated by an acid, a salt or a combination with an acid and a salt as a catalyst component (EP683180).

On the other hand, it has been proposed to carry out prepolymerization for purposes of improving powder properties of a polymer obtained, preventing fouling of a polymerization reactor or preventing occlusion in a line of transporting a polymer after the polymerization reactor (JP-A-5-295022).

However, the above techniques must have been further improved, and it has been difficult to prevent production of fine polymer particles or agglomeration of polymer particles during polymerization. Particularly, in production of a low melting point polymer, these phenomena have been remarkably caused and there have been serious problems that an industrial scale production plant could not be operated continuously and stably for a long time. Further, according to the methods disclosed in these publications, a polymerization activity per solid catalyst component is not always satisfactory, and development of a catalyst satisfying both a polymerization activity and an operation stability has been demanded.

A first object of the present invention is to provide a catalyst system producing satisfactory polymer particle properties and particularly to provide a catalyst system satisfying both a high activity and satisfactory polymer particle properties. More particularly, in production of a low melting point polymer, it is demanded to satisfy the above requirements.

A second object of the present invention is to provide a catalyst system able to carry out a stable polymerization of a low melting point polymer. Generally, when polymerization is supported out by using the same catalyst under the same polymerization temperature conditions, powder properties are degraded as a melting point of a polymer produced becomes lower, and therefore there is a lower limit to a melting point of a polymer allowable to be industrially produced. The present invention is to provide a catalyst system capable of lowering this lower limit of a melting point of a polymer allowable to be produced.

A third object of the present invention is to provide a catalyst having a high upper limit to a polymerization temperature. When polymerization is carried out by using the same catalyst under such a polymerization conditions as to produce a polymer having the same melting point, particle properties of a polymer having a higher polymerization temperature are degraded, and therefore there is an upper limit to a polymerization temperature allowable to be industrially used. The present invention is to provide a catalyst system capable of improving this upper limit of a polymerization temperature industrially usable.

A fourth object of the present invention is to provide a prepolymerization catalyst homogeneously prepolymerized so as to reduce a residue of a catalyst leading to degradation of an outer appearance of a product.

DISCLOSURE OF THE INVENTION

The present inventors have variously studied, and have discovered that the above problems can be solved by using an inorganic silicate having a specific structure as a catalyst component for olefin polymerization. The present invention has been accomplished on the basis of this discovery.

That is, the present invention employs an ion-exchange layered silicate having the following properties as a carrier:

(a) having a specific pore size distribution; and (b) having a carrier strength within a specific range.

Such a carrier as having these physical properties may be a material occurring in nature as far as having these properties (a naturally occurring material having these properties as it is has not been found by the present inventors up to now) or a material treated so specifically as to have these properties.

Examples of such treatments as to provide the aimed physical properties include:

(a) a chemical treatment illustrated below (particularly acid treatment) so as to be carried out under specific conditions to provide a specific pore size distribution;

(b) a granulation treatment carried out under specific conditions to provide a specific carrier strength; and (c) a treatment with a specific organic aluminum compound. A more satisfactory effect can be expected by combining these treatments.

Another means for achieving the above-mentioned objects of the present invention is to use a prepolymerization catalyst having a specific structure for main polymerization. The specific structure means a structure wherein active precursor sites of a metallocene catalyst are uniformly dispersed within a particle of a prepolymerization catalyst. Since the metallocene catalyst has a high polymerization activity, it is important to efficiently remove reaction heat generated by polymerization. If the active precursor sites of the metallocene catalyst are not uniformly dispersed, heat is not satisfactorily removed at the part and a temperature is locally raised. As this result, there are caused problems that a produced polymer is dissolved in a solvent, that a produced polymer is melted or polymer particles are agglomerated to each other and that a produced polymer is adhered to a reactor wall.

In the present invention, it has been intensively studied as to how uniformly the active precursor sites should be dispersed in order to prevent the above-mentioned problems, and it has been discovered that it is possible to observe a dispersion state of active precursor sites of a metallocene catalyst in a particle by means of fluorescent analysis. According to the present invention, the above problems can be solved if an index showing a uniform dispersibility (prepolymerization homogenization index: H-value) is within a specific range.

Examples of means for making H-value within a specific range in the present invention include:

(a) to use an ion-exchange layered silicate having the above-mentioned specific structure; and (b) to use specific prepolymerization conditions. A more satisfactory effect can be achieved by combining these operations.

EXPLANATION OF MARKS $D_{VM}$ represents a maximum peak intensity, $D_m$ represents a pore size diameter showing a maximum peak intensity, and $D_{m\,1/2}$ represents a pore size diameter on the smaller diameter side corresponding to a point, the peak intensity of which is ½ of the maximum peak intensity.

BEST MODE FOR CARRYING OUT THE INVENTION

Hereinafter, the present invention is described in more details. (Catalyst component for olefin polymerization) (1) Physical properties of carrier A catalyst component for olefin polymerization of the present invention employs an ion-exchange layered silicate having the following features 1 and 2:

feature 1: in a pore size distribution curve calculated from desorption isotherm by nitrogen adsorption-desorption method, a pore diameter Dm showing a maximum peak intensity $D_{VM}$ is from 60 to 200 Å; and feature 2: in a pore size distribution curve calculated from desorption isotherm by nitrogen adsorption-desorption method, a pore diameter $D_{m1/2}$ (Å) on the smaller pore size side corresponding to a ½ peak intensity of the maximum peak intensity $D_{VM}$ has a relation of $D_{m1/2}/D_m$ of at least 0.65 and less than 1 (the largest value is employed when there are a plurality of $D_{m1/2}$ values).

Nitrogen Adsorption-Desorption Method

Measurement of adsorption-desorption isotherm by nitrogen adsorption-desorption method is explained hereinafter.

A nitrogen gas is used for this measurement. When evaluating a pore size distribution, a nitrogen gas is used since it has satisfactory properties as a general adsorption gas.

The evaluation of the pore size distribution in the present invention employs desorption isotherm. The desorption isotherm is a curve obtained while reducing a relative pressure. The desorption isotherm shows a lower relative pressure to the same desorpted gas amount as compared with adsorption isotherm, and consequently shows a lower free energy state, and is generally considered to be closer to a state of real thermodynamical stability.

Examples of the above analyzing apparatus include commercially available products such as Autosorb of Quanta Chrome Company, Belsorp, of Nippon Bell Co. or Omnisorp of Coulter Inc. or the like. The present invention employs BJH method most general as a calculation method of pore size distribution.

An example of a measuring method is illustrated below. The measurement is carried out at a temperature of 77K under a relative pressure $P/P_0$ ($P_0$=atmospheric pressure) of from 0.02 to 1. In accordance with the BJH method, pore diameters (unit: Å) are expressed by the axis of abscissas and differential values of pore volumes (unit: $cm^3/g$) are expressed by the axis of ordinates. It is sufficient that the measurement time is generally one time.

Figure 1:
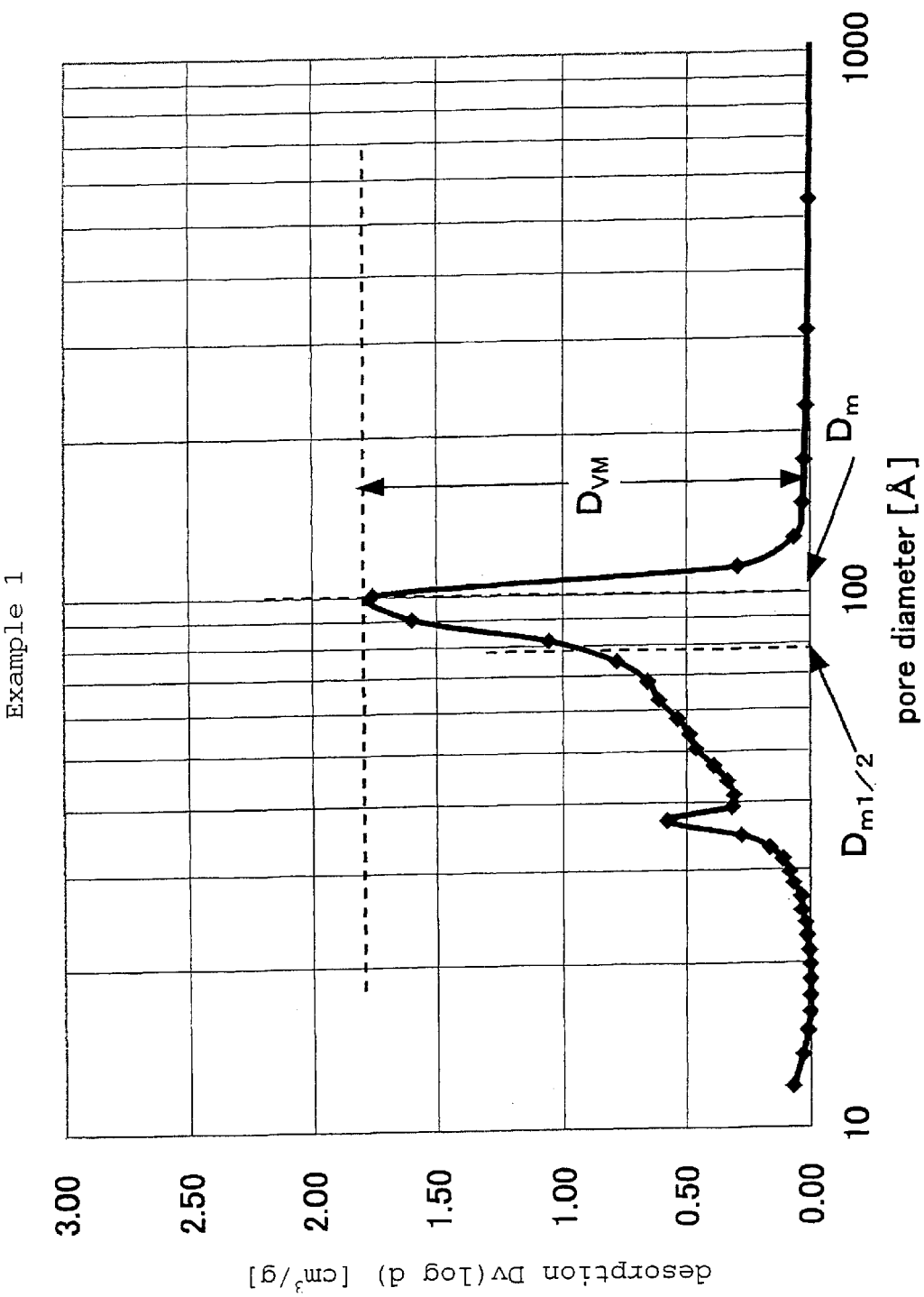
FIG. 1 illustrates a pore size distribution curve of an ion-exchange layered silicate used in Example 1.

Pore Size Distribution $D_m$ represents a pore diameter corresponding to the maximum value of values of ordinate (differential values of pore volumes), and is generally expressed as "most frequently appearing pore diameter". FIG. 1 illustrates an example of a graph showing pore size distribution. With regard to the pore size distribution curve of FIG. 1 (Example 1), a pore diameter of 101 Å corresponds to the most frequently appearing pore diameter, i.e. a pore diameter appearing in the highest proportion among all pore volumes. The ordinate value of $D_m$ is the maximum peak intensity $D_{Vm}$. $D_{m1/2}$ represents a pore diameter corresponding to a point on the smaller diameter side showing a half value of the maximum value $D_{VM}$ of ordinate. In FIG. 1, a pore diameter of 77 Å corresponds to $D_{m1/2}$. That is, a $D_{m1/2}/D_m$ ratio is taken as a measure of distribution based on the smaller pore side, and this value becomes smaller if the distribution is narrower. In FIG. 1, $D_{m1/2}/D_m$ is 77/101=0.76. Also, depending on shapes of pore size distribution curves, there is a case in which there are a plurality of $D_{m1/2}$ values, and in such a case, the largest value is decided to be the $D_{m1/2}$ value.

A pore diameter size showing the maximum peak intensity (generally referred to as "most frequently appearing pore diameter") is in a range of from 60 to 200 Å, preferably from 70 to 190 Å, more preferably from 80 to 180 Å. If the pore diameter Dm showing the maximum peak intensity $D_{VM}$ exceeds 200 Å, a carrier strength is lowered, and properties of polymer particles become unpreferably poor.

On the other hand, if the Dm value is less than 60 Å, uniform activation of a catalyst and uniform growth of polymer particles are hardly achieved and agglomeration of polymer particles or deposition of polymer particles on a reactor are caused.

A pore diameter $D_{m1/2}$ is present at least one respectively on both sides of $D_m$, i.e. on the larger diameter side of $D_m$ and on the smaller diameter side of $D_m$, but a value on the smaller diameter side is taken as the $D_{m1/2}$ value in the present invention. Also, if there are a plurality of $D_{m1/2}$ values on the smaller diameter side, the largest value is employed for calculation. A $D_{m1/2}/D_m$ value is preferably at least 0.68, more preferably at least 0.70. If the $D_{m1/2}/D_m$ value is less than 0.68, it is not preferable since a considerable amount of small size pores are contained.

By using an ion-exchange layered silicate having the above "feature 1" and "feature 2" for an olefin polymerization catalyst component (cocatalyst) as an activating agent for a metallocene complex, the following function mechanism is considered to work. Thus, the ion-exchange layered silicate has a predetermined size pore, but its pore size is sufficiently large to a metallocene complex, an organic aluminum compound and a monomer. Accordingly, these compounds participating in the reaction easily enter into pores in respective stages of formation of a catalyst, activation, prepolymerization and polymerization, and complexes are highly dispersed in carriers, and consequently metallocene catalyst active sites are uniformly formed.

Further, it is very important for uniform growth of catalyst particles to have carriers dispersed in a form of fine particles along with growth of polymer particles, and carriers having such a specific pore size distribution as defined in the present invention are considered to achieve this effect. In the polymerization reaction, such a catalyst inhibits local heat generation on the catalyst as compared with a conventional catalyst. Particularly when producing an easily meltable or soluble polymer, it is possible to carry out a highly active polymerization in a state of maintaining satisfactory particles, e.g. in a propylene type low melting point random polymerization, which could not be conventionally achieved.

Carrier Strength

In the present invention, it is preferable to maintain a carrier strength of an ion-exchange layered silicate within a predetermined range. Thus, it is preferable to satisfy the following "feature 3".

Feature 3: an average crushing strength of an ion-exchange layered silicate measured by a minute compression tester is at least 3 MPa.

If the carrier strength is too low, catalyst powder and polymer particles are easily crushed to produce fine powders which degrade flowing properties and adhesive properties and lower a bulk density. Accordingly, in the present invention, it is important that an average crushing strength of a carrier should be at least 3 MPa. Preferably, the average crushing strength is at least 5 MPa, more preferably at least 7 MPa.

On the other hand, if the carrier strength is too high, particle growth during prepolymerization or polymerization becomes ununiform and there is a fear of producing fine powders. Accordingly, the upper limit of the carrier strength is preferably an average crushing strength of at most 20 MPa, more preferably at most 18 MPa. Even when prepolymerization is carried out, the upper limit and the lower limit of an average crushing strength are adjusted in the same manner as above, and are effectively in a range of from 3 to 18 MPa.

The ion-exchange layered silicate of the present invention preferably has the feature 3 in addition to the above feature 1 and feature 2, but further has the following features (feature 4 is described hereinafter).

Feature 5: in a pore size distribution curve calculated from desorption isotherm by nitrogen adsorption-desorption method, a pore diameter $D_{m1/3}$ on the smaller pore size side corresponding to a ⅓ peak intensity of the maximum peak intensity $D_{VM}$ has a relation of $D_{m1/3}/D_m$ of at least 0.55 and less than 1 (provided that if there are a plurality of $D_{m1/3}$ values, the largest value is employed for $D_{m1/3}$).

Such a pore diameter $D_{m1/3}$ value is present respectively on both sides of $D_m$, i.e. at least one on the larger diameter side of $D_m$ and at least one on the smaller diameter side of $D_m$, but in the present invention, a value on the smaller diameter side is defined as $D_{m1/3}$. Also, when there are a plurality of $D_{m1/3}$ values on the smaller diameter side, the largest value is employed for calculation. A $D_{m1/3}/D_m$ value is preferably at least 0.56, more preferably at least 0.57. If the $D_{m1/3}/D_m$ value is less than 0.56, a considerable amount of smaller diameter pores are contained, such being unpreferable.

Feature 6: a pore size distribution calculated from desorption isotherm by nitrogen adsorption-desorption method has substantially unimodal peak.

That is, there is not present a second peak, and if it is present, its intensity is at most 50%, preferably at most 40%, particularly at most 30% of a maximum peak intensity $D_{VM}$.

Feature 7: BET surface area is from 150 to 250 m²/g.

The surface area controls a site capable of being an active site, and has a possibility of preventing fusion, and an ion-exchange layered silicate having a BET surface area value within this range is preferable.

Feature 8: a pore volume is from 0.2 to 2.0 cm³/g, preferably from 0.25 to 1.8 cm³/g, more preferably from 0.3 to 1.5 cm³/g.

Feature 9: in a pore size distribution curve calculated from desorption isotherm by nitrogen adsorption-desorption method, wherein a peak intensity at a pore diameter of 50 Å is defined as $D_{V50_Å}$, $D_{V50_Å}/D_{VM}$ is at least 0.01 and at most 0.40, preferably at least 0.03 and at most 0.38, more preferably at least 0.05 and at most 0.36.

If the $D_{V50_Å}/D_{VM}$ value exceeds 0.38, a considerable amount of smaller diameter pores are contained, such being unpreferable.

(2) Ion-Exchange Layered Silicate

In the present invention, an ion-exchange layered silicate used as a starting material is a silicate compound having a crystal structure wherein planes formed by ionic bond are laminated in parallel with mutual bonding force and ions contained between planes are exchangeable. Most of ion-exchange layered silicates naturally occur as a main component of clay minerals, and often contain impurities (such as quartz, cristobalite or the like), but it is all right to contain these impurities. Also, the starting material of the present invention means a silicate at a stage before chemical treatment of the present invention as described below. Further, the ion-exchange layered silicates used in the present invention may be not only naturally occurring materials but also artificially synthesized materials.

Examples of these ion-exchange layered silicates may be the following materials as described in "Clay Minerals (Nendo Kobutsu Gaku)" written by Haruo Shiramizu (published by Asakura Shoten in 1995).

(a) Examples of an ion-exchange layered silicate comprising a 1:1 layer as a main constituting layer include kaolin group silicates such as dickite, nacrite, kaolinite, anauxite, metahalloysite, halloysite or the like, and serpentine group silicates such as chrysotile, lizaldite, antigorite or the like.

(b) Examples of an ion-exchange layered silicate comprising a 2:1 layer as a main constituting layer include smectite group silicates such as montmorillonite, zauconite, beidellite, nontronite, saponite, hectorite, stephensite or the like, vermiculite group silicates such as vermiculite or the like, mica group silicates such as mica, illite, sericite, glauconite or the like, and attapulgite, sepiolite, palygorskite, bentonite, pyrophyllite, talc, chlorites and the like.

A silicate used as a starting material in the present invention may be a layer-like silicate having a mixture layer of the above (a) and (b) groups formed. In the present invention, it is preferable to use a silicate having the 2:1 type layer as the main component, preferably the smectite group, particularly montmorillonite. A kind of intercalation cations is not specially limited, but a silicate having an alkali metal or alkali earth metal as a main component for an intercalation cation is preferable in respect that such a silicate is relatively easily available at a low cost as an industrial starting material.

Chemical Treatment

An ion-exchange layered silicate used in the present invention may be a naturally occurring material or a material available for an industrial starting material as it is, but it is preferable for obtaining a highly active catalyst to have the ion-exchange layered silicate subjected to a chemical treatment. Examples of the chemical treatment include an acid treatment, an alkali treatment, a salt treatment, an organic material treatment and the like. The chemical treatment employed may be any of a surface treatment for removing impurities deposited on a surface and a treatment having an influence on a structure of clay. It is possible to employ the chemical treatment in order to obtain such properties of pore size distribution as defined in the present invention.

The acid treatment removes impurities on a surface but also can elute a part or all of cations such as Al, Fe, Mg or the like in a crystal structure. An acid used in the acid treatment is selected preferably from hydrochloric acid, sulfuric acid, nitric acid, phosphoric acid, acetic acid and oxalic acid. Usually, the acid is used in a form of an acid aqueous solution. The acid used in the treatment may be a mixture of at least two kinds of acids.

General treating conditions with acid may be optionally selected from an acid concentration in a range of from 0.1 to 50 wt %, a treating temperature in a range of from room temperature to a boiling point and a treating time in a range of from 5 minutes to 24 hours. It is preferable to carry out the treatment under such conditions as to elute at least a part of a material constituting at least one kind of compound selected from the group of ion-exchange layered silicates.

A particularly preferable embodiment of the present invention is to carry out a treatment with an acid having a specific concentration. That is, it is preferable to carry out a treatment with an acid having an acid concentration (N) satisfying the following formula at least once. In the present invention, this operation is referred to as "concentrated acid treatment".

$$N \geq 6.0$$

The acid concentration N is defined as (mol number of acid)×(valence number of acid)/(volume of acid aqueous solution) (unit: mol/L). However, a salt coexists, a crystal water amount contained in a salt compound is considered, but a volume change by the salt is not considered. A specific gravity of the acid aqueous solution was sited from Basic Edition II-4 of Chemical Handbook (Kagaku Binran) (by the Japan Chemical Society, published by Maruzen, revised third edition).

It is not clear why the treatment of an ion-exchange layered silicate under such specific conditions is effective, but it is considered as described below.

Generally, it is known that by subjecting the silicate to acid treatment, impurities on its surface are removed and cations such as Al, Fe, Mg or the like in its crystal structure are eluted, thereby increasing a surface area. Thus, in accordance with the progress of acid treatment, it is considered that a surface area and a pore volume are increased. However, in case of such concentrated acid treatment as carried out in the present invention, a surface area value of a silicate treated by the concentrated acid treatment employing such an acid concentration (N) as defined in the present invention is rather smaller than a surface area of a silicate treated by an acid treatment employing a lower acid concentration to have the same constituting components eluted. This fact means that a pore size of the silicate becomes larger. It is expected that this change achieves an effect of easily moving a material between an outer part and an inner part of a catalyst. Thus, a silicate treated by an acid having a high concentration provides a larger pore size, and it is expected that material movement (of a metallocene complex, a monomer, an organic aluminum compound or the like) becomes easy in the inside of a catalyst or constituting particles in the same manner as in the outside. Accordingly, a catalyst prepared from the silicate of the present invention has active sites more uniformly dispersed, and it is considered that a local heat generation on the catalyst is inhibited as compared with a conventional catalyst. Particularly, when producing an easily meltable or soluble polymer, e.g. in a case of low melting point random polymerization of a propylene type monomer, it is possible to carry out polymerization at a high activity and in a state of maintaining dispersed particles, which could not be conventionally achieved.

A more preferable range of the acid concentration range of the acid concentration (N) (mol number of acid)×(valence number of acid)/(volume of acid aqueous solution) (unit: liter) of the present invention is at least 6.0, preferably at least 7.0. The upper limit of the acid concentration N is preferably at most 20, particularly at most 15, in view of handling safety, easiness and equipments.

An acid used for the concentrated acid treatment may be the same as those used in an ordinary acid treatment, but is preferably sulfuric acid, nitric acid or hydrochloric acid, more preferably sulfuric acid. By such a specific treatment, an ion-exchange layered silicate having the above-mentioned feature 1 and feature 2 and/or at least one properties selected from feature 3 and feature 5 to feature 9 can be obtained. Further, in the present invention, it is preferable to carry out a salt treatment. The salt treatment means a treatment carried out for the purpose of exchanging cations in an ion-exchange layered silicate. The treating conditions with a salt are not specially limited, but it is preferable to carry out the salt treatment under conditions of a salt concentration of from 0.1 to 50 wt %, a treating temperature of from room temperature to a boiling point and a treating time of from 5 minutes to 24 hours in such a manner as to elute at least a part of materials constituting an ion-exchange layered silicate. Also, the salt may be used in an organic solvent such as toluene, n-heptane, ethanol or the like, or may be used in the absence of a solvent if it is liquid-like at the treating temperature, but it is preferably used as an aqueous solution. However, depending on a kind of a salt employed, the salt treatment achieves an effect similar to an acid treatment.

In the present invention, it is preferable to ion exchange at least 40%, preferably at least 60% of ion-exchangeable cations of Group 1 metals contained in an ion-exchange layered silicate with cations dissociated from the following salts.

Usable salts include a compound obtained from a cation containing at least one atom selected from the group consisting of Group 1 to 14 atoms and at least one anion selected from the group consisting of a halogen atom, an inorganic acid and an organic acid, preferably a compound obtained from a cation containing at least one atom selected from the group consisting of Groups 2 to 14 atoms and at least one anion selected from the group consisting of Cl, Br, I, F, $PO_4$, $SO_4$, $NO_3$, $CO_3$, $C_2O_4$, $OCOCH_3$, $CH_3COCHCOCH_3$, $OCl_3$, $O(NO_3)_2$, $O(ClO_4)_2$, $O(SO_4)$, OH, $O_2Cl_2$, $OCl_3$, OCOH, $OCOCH_2CH_3$, $C_2H_4O_4$ and $C_6H_5O_7$.

Examples of the salts include $Li_2SO4$, $CaCl_2$, $CaSO_4$, $CaC_2O_4$, $Ca(NO_3)_2$, $Ca_3(C_6H_5O_7)_2$, $MgCl_2$, $Sc(OCOCH_3)_2$, $ScF_3$, $ScBr_3$, $Y(OCOCH_3)_3$, $LaPO_4$, $La_2(SO_4)_3$, $Sm(OCOCH_3)_3$, $SmCl_3$, $Yb(NO_3)_3$, $Yb(ClO_4)_3$, $Ti(OCOCH_3)_4$, $Ti(CO_3)_2$, $Ti(SO_4)_2$, $TiF_4$, $TiCl_4$, $Zr(OCOCH_3)_4$, $Zr(CO_3)_2$, $Zr(NO_3)_4$, $ZrOCl_2$, $Hf(SO_4)_2$, $HfI_4$, $HfBr_4$, $V(CH_3COCHCOCH_3)_3$, $VOSO_4$, $VCl_4$, $VBr_4$, $Nb(CH_3COCHCOCH_3)_5$, $Nb_2(CO_3)_5$, $Ta_2(CO_3)_5$, $Ta(NO)5$, $TaCl_5$, $Cr(OOCH_3)_2OH$, $Cr(NO_3)_3$, $Cr(ClO_4)_3$, $MoOCl_4$, $MoCl_3$, $MoCl_4$, $MoCl_5$, $MoF_6$, $WCl_4$, $WBr_5$, $Mn(CH_3COCHCOCH_3)_2$, $Mn(NO_3)_2$, $Fe(OCOCH_3)_2$, $Fe(NO_3)_3$, $FeSO_4$, $Co(OCOCH_3)_2$, $Co_3(PO_4)_2$, $CoBr_2$, $NiCO_3$, $NiC_2O_4$, $Pb(OCOCH_3)_4$, $Pb(OOCH_3)_2$, $PbCO_3$, $Pb(NO_3)_2$, $CuI_2$, $CuBr_2$, $CuC_2O_4$, $Zn(OOCH_3)_2$, $Zn(CH_3COCHCOCH_3)_2$, $ZnSO_4$, $Cd(OCOCH_2CH_3)_2$, $CdF_2$, $AlCl_3$, $Al_2(C_2O_4)_3$, $Al(CH_3COCHCOCH_3)_3$, $GeCl_4$, $GeBr_4$, $Sn(OCOCH_3)_4$, $Sn(SO_4)_2$, and the like.

At least two kinds of salts and acids may be used. When combining a salt treatment and an acid treatment, there are a method of carrying out an acid treatment after conducting a salt treatment, a method of carrying out a salt treatment after conducting an acid treatment, and a method of carrying out a salt treatment and an acid treatment at the same time.

Examples of a chemical treatment with other compounds include an alkali treatment with LiOH, NaOH, KOH, $Mg(OH)_2$, $Ca(OH)_2$, $Sr(OH)_2$, $Ba(OH)_2$ or the like, and an organic material treatment with trimethyl ammonium, triethyl ammonium or the like. Examples of an anion constituting an organic material treating agent include hexafluorophosphate, tetrafluoroborate, tetraphenylborate or the like, in addition to anions illustrated as an anion constituting a salt treating agent, but should not be limited thereto.

Granulation

An average particle size of a silicate of the present invention is preferably at least 5 $\mu$m and at most 100 $\mu$m. If there are present many fine particles having an average particle size of less than 5 $\mu$m, polymers are agglomerated and easily adhered to a reactor, and an unpreferable short pass or a long term retention is caused depending on a polymerization process. On the other hand, coarse particles having an average particle size of at least 100 $\mu$m are liable to cause occlusion (for example, at the time of catalyst feeding), such being unpreferable. If particles do not cause such problems, they may be a naturally occurring material or a commercially available material, which may be used as it is, and also these materials may be used after adjusting their particle sizes by classification operation, separation operation or the like.

A granulation method is not specially limited as far as it is a method for providing particles satisfying the above-mentioned particle size and shape conditions, but a spray granulation method is preferable. As mentioned above, a particle strength can be controlled during granulation step. In order to obtain a crushing strength in a preferable range, it is preferable to regranulate pulverized silicate particles of the present invention. The silicate may be pulverized by any method. As a pulverization method, any method of dry system pulverization or wet system pulverization may be used, but wet system pulverization is preferable. Wet system pulverization means a pulverization method employing swelling properties of a silicate by using water as a dispersion medium. Examples of the method include a method of employing compulsory stirring system with polytron or the like, and a method of employing dynomill, pearl mill or the like. Before granulation, particle size and a volume fraction of particles of less than 1 $\mu$m are an average particle size of from 0.01 to 5 $\mu$m and a particle fraction of less than 1 $\mu$m of at least 10%, preferably an average particle size of from 0.1 to 3 $\mu$m and a particle fraction of less than 1 $\mu$m of at least 40%. A dispersing agent used for spray granulation is usually water.

Granulated particles preferably have a sphere-like shape. A concentration of a silicate in a starting material slurry for spray granulation to obtain sphere-like particles depends on a slurry viscosity but is generally from 0.1 to 50%, preferably from 1 to 30%, more preferably from 2 to 20%. A temperature at a hot air entrance for spray granulation to obtain sphere-like particles varies depending on a dispersion medium, but in a case of water, it is from 80 to 260° C., preferably from 100 to 220° C.

In order to produce a silicate having a specific pore size distribution of the present invention, it is preferable to carry out granulation before a chemical treatment.

Generally, an ion-exchange layered silicate contains adsorbed water and intercalation water. In the present invention, it is preferable to remove adsorbed water and intercalation water previously before using the silicate. It is usual to employ a heat treatment for removing water. Its method is not specially limited, but it is necessary to select such conditions as not to remain adsorbed water and intercalation water and not to destroy its structure. The heating time is at least 0.5 hour, preferably at least one hour. In such a case, a water content after the removal is at most 3 wt %, preferably at most 1 wt %, as compared with a water content of 0 wt % defined when the silicate is dehydrated at a temperature of 200° C. under a pressure of 1 mmHg for 2 hours.

Treatment with Organic Aluminum Compound

In the present invention, in order to prevent a catalytic active site from being poisoned with water remained or a hydroxyl group present in an ion-exchange layered silicate, the ion-exchange layered silicate may be subjected to contact treatment with an organic aluminum compound (in the present specification, such an organic aluminum compound as used for treating the silicate is referred to as "organic AL(1)") before prepolymerization or main polymerization. As the organic AL(1), an organic aluminum compound having an optional structure is generally usable. The ion-exchange layered silicate mentioned herein is preferably a silicate treated as mentioned above (including a combination of a plurality of treatments).

Particularly, by using the silicate treated with an organic aluminum compound having a specific structure, not only its activity is improved but also it is possible to reduce agglomeration of polymer particles and a polymer amount fused onto a polymerization tank wall or a pipe wall in polymerization atmosphere. The organic aluminum compound having a specific structure is expressed by the following formula (X).

$$AlR_nY_{3-n} \tag{X}$$

(R is a hydrocarbon group having a carbon number of from 4 to 12, Y is hydrogen, halogen, an alkoxy group or a siloxy group, and n is a number larger than 0 and at most 3.)

Examples of a preferable organic aluminum compound include tri-n-butylaluminum, triisobutylaluminum, tri-n-pentylauminum, tri-n-hexylaluminum, tri-n-heptylaluminium, tri-n-octylaluminum, tri-n-decylaluminum, tri-n-dodecylaluminum, diisobutylaluminum chloride, di-n-octylaluminum chloride, diisobutylaluminum hydride, di-n-octylaluminum hydride, diisobutylaluminum ethoxide, di-n-octylaluminum ethoxide, and the like.

Also, it is possible to use a combination of organic aluminum compounds wherein n is different. For example, it is possible to use a mixture of organic aluminum compounds expressed by the following formula.

$$(Oct)_{2.5}(Et)_{0.5}AL$$

wherein Oct=$C_8H_{17}$ and Et=$C_2H_5$.

Among these compounds, preferable examples include a trialkyl aluminum (n=3) and a dialkyl aluminum hydride. More preferable examples include a $C_4$-$C_{12}$ trialkyl aluminum, concrete examples of which include triisobutyl aluminum and tri-n-octyl aluminum.

It is not clear why the above effect can be achieved, but when treating a carrier with an organic aluminum compound such as tri-n-octyl aluminum (TnOA) having a longer alkyl chain and a more bulky substituent as compared with conventionally used triethyl aluminum, it is considered that a cohering force of primary particles constituting a carrier is lowered and a carrier strength is weakened, and accordingly a uniform growth becomes possible. Consequently, it is expected that a polymerization heat and a heat removal per unit volume are considerably well balanced, and agglomeration by fusion between polymers and deposition of a melted polymer on a polymerization tank wall can be prevented. Also, by relaxing agglomeration of particles and improving a bulk density of a polymer, productivity can be improved.

Contact between an ion-exchange layered silicate and an organic AL (1) can be carried out under an inert gas atmosphere such as nitrogen in a solvent of an inert hydrocarbon such as hexane, heptane, pentane, cyclohexane, benzene, toluene, xylene or the like, and the solvent may be used alone or in a mixture of two or more.

An amount of an organic AL (1) used is preferably from 0.01 to 1,000 mmol, more preferably from 0.1 to 100 mmol, per 1 g of an ion-exchange layered silicate.

A concentration of an ion-exchange layered silicate in a solvent is preferably from 0.001 to 100 g/mL, more preferably from 0.01 to 10 g/mL, and a concentration of an organic AL (1) is preferably from 0.001 to 100 mmol/mL, more preferably from 0.01 to 10 mmol.

Contacting may be carried out by dispersing an ion-exchange layered silicate in a solvent and then bringing an organic AL (1) in contact therewith. Alternatively, contacting may be carried out by adding an organic AL (1) to a solvent and then dispersing an ion-exchange layered silicate therein.

The contacting treatment is carried out generally at a temperature of from −50° C. to a boiling point of a solvent, preferably from 0° C. to a boiling point of a solvent. The contacting time is from 1 minute to 48 hours, preferably from 1 minute to 24 hours.

The order of contacting an organic AL (1) with an ion-exchange layered silicate is not specially limited as far as the object of the present invention is achieved, but it is more effective to carry out the contacting treatment after chemical treatment of the silicate or preferably after drying carried out after the chemical treatment.

Also, the order of the contacting treatment step of an organic AL (1) and an ion-exchange layered silicate and the granulation step of an ion-exchange layered silicate is not specially limited as far as the object of the present invention is achieved, but it is preferable to carry out the treatment with an organic AL (1) after granulating the silicate.

Further, it is possible to enhance the effect of the present invention by combining the above-mentioned respective treatments. Thus, after controlling a particle size distribution and a carrier particle strength by granulating an ion-exchange layered silicate, a carrier obtained through the following Step 1 and Step 2 is used as a catalyst component for olefin polymerization.

Step 1: after granulating an ion-exchange layered silicate, the silicate is treated with an acid having an acid concentration (N) satisfying the following formula (I), $$N \geq 6.0 \qquad \text{(Formula (I))}$$

wherein the acid concentration N is expressed by (mol number of acid)×(valency number of acid)/(volume of acid aqueous solution)(unit: liter).

Step 2: after carrying out the step 1, the silicate is treated with an organic AL (1) which is an organic aluminum compound having an alkyl group having at least 4 carbon number.

(Olefin Polymerization Catalyst)

In the present invention, an olefin polymerization catalyst can be prepared by contacting component (A) and component (B), and optionally component (C).

Component (A): a metallocene compound of Groups 4 to 6 of the Periodic Table

Component (B): an ion-exchange layered silicate having the above-mentioned feature 1 and feature 2

Component (C): an organic aluminum compound

As the component (B), such various embodiments as described in the above paragraph "catalyst component for olefin polymerization" can be used.

<Explanation of Component (A)>

A metallocene compound used in the present invention is a transition metal compound of Groups 4 to 6 of the Periodic Table, which has at least one conjugated 5-membered ring ligand. Preferable examples of such a transition metal compound include compounds expressed by the following formulae (1), (2), (3) and (4).

Wherein A and A' are conjugated 5-membered ring ligands which may have a substituent (A and A' may be same or different in the same compound), Q is a bonding group crosslinking two conjugated 5-membered ring ligands at an optional position, Z is a ligand containing a nitrogen atom, an oxygen atom, a silicon atom, a phosphorus atom or a sulfer atom, Q' is a bonding group crosslinking Z with a conjugated 5-membered ring ligand at an optional position, M is a metal atom selected from the group consisting of Groups 4 to 6 of the Periodic Table, and X and Y are a hydrogen atom, a halogen atom, a hydrocarbon group, an alkoxy group, an amino group, a phosphorus-containing hydrocarbon group or a silicon-containing hydrocarbon group (X and Y may be the same or different in the same compound).

Examples of A and A' include a cyclopentadienyl group. The cyclopentadienyl group may contain 5 hydrogen atoms ($C_5H_5$—), or its derivative, and some of the hydrogen atoms may be substituted with a substituent.

Examples of the substituent include a $C_1$–$C_{40}$, preferably $C_1$–$C_{30}$ hydrocarbon group. This hydrocarbon group may be bonded as a monovalent group to a cyclopentadienyl group, or if there are present a plurality of groups, two of them may be respectively bonded to other terminals (ω-terminal) to form a ring together with a part of cyclopentadienyl. Later examples include a condensed 6-membered ring wherein two substituents are respectively bonded to ω-terminals together with adjacent two carbon atoms in the cyclopentadienyl group such as an indenyl group, a tetrahydroindenyl group or a fluorenyl group, and a condensed 7-membered ring such as an azulenyl group or a tetrahydroazulenyl group.

Thus, examples of conjugated 5-membered ring ligands represented by A and A' include a cyclopentadienyl group, an indenyl group, a fluorenyl group or an azulenyl group, which may be substituted or unsubstituted. Among them, a preferable example is an azulenyl group.

Examples of a substituent on the cyclopentadienyl group include the above-mentioned $C_1$–$C_{40}$, preferably $C_1$–$C_{30}$ hydrocarbon group, as well as a halogen atom group such as fluorine, chlorine or bromine, a $C_1$–$C_{12}$ alkoxy group, a silicon-containing hydrocarbon group expressed by —Si($R^1$) ($R^2$) ($R^3$), a phosphorus-containing hydrocarbon group expressed by —P($R^1$) ($R^2$), or a boron-containing hydrocarbon group expressed by —B($R^1$) ($R^2$). If there are present a plurality of these substituents, these substituents may be the same or different. The above-mentioned $R^1$, $R^2$ and $R^3$ may be the same or different, and are alkyl groups having a carbon number of from 1 to 24, preferably from 1 to 18.

Q is a bonding group crosslinking two conjugated 5-membered ring ligands at an optional position, and Q' is a bonding group crosslinking a group represented by Z with a conjugated 5-membered ring ligand at an optional position.

Examples of Q and Q' include, (a) alkylene groups such as a methylene group, an ethylene group, an isopropylene group, a phenylmethylmethylene group, a diphenylmethylene group or a cyclohexylene group, (b) silylene groups such as a dimethylsilylene group, a diethylsilylene group, a dipropylsilylene group, a diphenylsilylene group, a methylethylsilylene group, a methylphenylsilylene group, a methyl-t-butylsilylene group, a disilylene group or a tetramethyldisilylene group, and (c) hydrocarbon groups containing germanium, phosphorus, nitrogen, boron or aluminum, concrete examples of which include $(CH_3)_2Ge$, $(C_6H_5)_2Ge$, $(CH_3)P$, $(C_6H_5)P$, $(C_4H_9)N$, $(C_6H_5)N$, $(C_4H_9)B$, $(C_6H_5)B$, $(C_6H_5)Al$ and $(C_6H_5O)Al$. Preferable examples include alkylene groups and silylene groups.

M is a transition metal atom selected from the group consisting of Groups 4 to 6 of the Periodic Table, preferably Group 4 metal atoms of the Periodic Table, concrete examples of which include titanium, zirconium, hafnium and the like. Particularly, zirconium and hafnium are preferable.

Z is a ligand including a nitrogen atom, an oxygen atom, a silicon atom, a phosphorus atom or a sulfur atom, or a hydrogen atom, a halogen atom or a hydrocarbon group. Preferable examples include an oxygen atom, a sulfur atom, a $C_1$–$C_{20}$, preferably $C_1$–$Cl_2$ thioalkoxy group, a $C_1$–$C_{40}$, preferably $C_1$–$C_{18}$ silicon-containing hydrocarbon group, a $C_1$–$C_{40}$, preferably $C_1$–$C_{18}$ nitrogen-containing hydrocarbon group, a $C_1$–$C_{40}$, preferably $C_1$–$C_{18}$ phosphorus-containing hydrocarbon group, a hydrogen atom, chlorine, bromine, or a $C_1$–$C_{20}$ hydrocarbon group.

X and Y are respectively hydrogen, a halogen atom, a $C_1$–$C_{20}$, preferably $C_1$–$C_{10}$ hydrocarbon group, a $C_1$–$C_{20}$, preferably $C_1$–$C_{10}$ alkoxy group, an amino group, a $C_1$–$C_{20}$, preferably $C_1$–$C_{12}$ phosphorus-containing hydrocarbon group such as a diphenylphosphino group, or a $C_1$–$C_{20}$, preferably $C_1$–$C_{12}$ silicon-containing hydrocarbon group such as a trimethylsilyl group or a bis(trimethylsilyl)methyl group. X and Y may be the same or different. Among them, a halogen atom, a hydrocarbon group, particularly a $C_1$–$C_8$ hydrocarbon group, and an amino group are preferable.

(a) Examples of a compound expressed by the formula (1) include bis(methylcyclopentadienyl)zirconium dichloride, bis(ethylcyclopentadienyl)zirconium dichloride, bis(propylcyclopentadienyl)zirconium dichloride, bis(n-butylcyclopentadienyl)zirconium dichloride, bis(1,3-dimethylcyclopentadienyl) zirconium dichloride, bis(1-ethyl-3-methylcyclopentadienyl)zirconium dichloride, bis(1-n-butyl-3-methylcyclopentadienyl)zirconium dichloride, bis(1-i-butyl-3-methylcyclopentadienyl)zirconium dichloride, bis(1-t-butyl-3-methylcyclopentadienyl) zirconium dichloride, bis(1,3-dimethylcyclopentadienyl)zirconium dimethyl, bis(1, 3-dimethylcyclopentadienyl)zirconium methylchloride, bis(1,3-dimethylcyclopentadienyl) zirconium diethyl, bis(1,3-dimethylcyclopentadienyl) zirconium diisobutyl, bis(1,3-dimethylcyclopentadienyl)zirconium chloride monohydride, bis(1-n-butyl-3-methyl-cyclopentadienyl)zirconium dihydride, bis(1,3-dimethylcyclopentadienyl)zirconium dimethoxide, bis (1,3-dimethylcyclopentadienyl)zirconium bis (dimethylamide), bis(1-n-butyl-3-methyl-cyclopentadienyl)zirconium diethylamidomonochloride, bis(1-methyl-3-trifluoromethylcyclopentadienyl)zirconium dichloride, bis(1-methyl-3-trimethylsilylcyclopentadienyl) zirconium dichloride, bis(1-cyclohexyl-3-methylcyclopentadienyl)zirconium dichloride, bis(1-methyl-3-phenylcyclopentadienyl)zirconium dichloride, bis(1-benzyl-3-methylcyclopentadienyl) zirconium dichloride, bis(1-n-butyl-3-trifluoromethylcyclopentadienyl)zirconium dichloride, bis(indenyl)zirconium dichloride, bis (tetrahydroindenyl)zirconium dichloride, bis(2-methyl-tetrahydroindenyl)zirconium dichloride, and the like.

(b) Examples of a compound expressed by the formula (2) include dimethylsilylenebis{1-(2-methyl-4-isopropyl-4H-azulenyl)}zirconium dichloride, dimethylsilylenebis{1-(2-methyl-4-phenyl-4H-azulenyl)}zirconium dichloride, dimethylsilylenebis[1-{2-methyl-4-(4-fluorophenyl)-4H-azulenyl}] zirconium dichloride, dimethylsilylenebis[1-{2-methyl-4-(4-chlorophenyl)-4H-azulenyl}]zirconium dichloride, dimethylsilylenebis[1-{2-methyl-4-(3-chlorophenyl)-4H-azulenyl}]zirconium dichloride, dimethylsilylenebis[1-{2-methyl-4-(2,6-dimethylphenyl)-4H-azulenyl}]zirconium dichloride, dimethylsilylenebis{1-(2-methyl-4,6-diisopropyl-4H- azulenyl)}zirconium dichloride, diphenylsilylenebis{1-(2-methyl-4-phenyl-4H-azulenyl)}zirconium dichloride, methylphenylsilylenebis{1-(2-methyl-4-phenyl-4H-4-azulenyl)}zirconium dichloride, dimethylphenylsilylenebis[1-{2-methyl-4-(1-naphthyl)-4H-azulenyl}]zirconium dichloride, methylphenylsilylenebis[1-{2-methyl-4-(4-chlorophenyl)-4H-azulenyl}]zirconium dichloride, methylphenylsilylenebis[1-{2-methyl-4-(4-fluorophenyl)-4H-azulenyl}]zirconium dichloride, methylphenylsilylenebis[1-{2-methyl-4-(3-chlorophenyl)-4H-azulenyl}]zirconium dichloride, dimethylsilylenebis{1-(2-ethyl-4-phenyl-4H-azulenyl)}zirconium dichloride, dimethylsilylenebis[1-{2-ethyl-4-(1-naphthyl)-4H-azulenyl)]zirconium dichloride, dimethylsilylenebis[1-{2-ethyl-4-(4-chlorophenyl)-4H-azulenyl)]zirconium dichloride, dimethylsilylenebis[1-(2-ethyl-4-(4-fluorophenyl)-4H-azulenyl]zirconium dichloride, dimethylsilylenebis[1-{2-ethyl-4-(3-chlorophenyl)-4H-azulenyl}]zirconium dichloride, dimethylsilylenebis[1-{2-ethyl-4-(2-naphthyl)-4H-azulenyl}]zirconium dichloride, dimethylsilylenebis[1-{2-ethyl-4-(1-anthracenyl)-4H-azulenyl}]zirconium dichloride, dimethylsilylenebis[1-{2-ethyl-4-(2-anthracenyl)-4H-azulenyl}]zirconium dichloride, dimethylsilylenebis[1-{2-ethyl-4-(9-anthracenyl)-4H-azulenyl}]zirconium dichloride, dimethylsilylenebis[1-{2-ethyl-4-(1-phenanthryl)-4H-azulenyl}]zirconium dichloride, dimethylsilylenebis[1-{2-ethyl-4-(9-phenanthryl)-4H-azulenyl}]zirconium dichloride, dimethylmethylenebis{1-[2-methyl-4-(4-biphenylyl)-4H-azulenyl]}zirconium dichloride, dimethylgelmylenebis{1-[2-methyl-4-(4-biphenylyl)-4H-azulenyl]}zirconium dichloride, ethylenebis{1-[2-methyl-4-(4-biphenylyl)-4H-azulenyl]}zirconium dichloride, dimethylsilylenebis{1-[2-i-propyl-4-(4-biphenylyl)-4H-azulenyl]}zirconium dichloride, dimethylsilylenebis{1-[2-methyl-4-(2-fluoro-4-biphenylyl)-4H-azulenyl]}zirconium dichloride, dimethylsilylenebis-{1-[2-ethyl-4-(2-fluoro-4-biphenylyl)-4H-azulenyl]}zirconium dichloride, dimethylsilylenebis{1-[2-methyl-4-(2',6'-dimethyl-4-biphenylyl)-4H-azulenyl]}zirconium dichloride, dimethylsilylenebis{1-[2-methyl-4-(1-naphthyl)-4H-azulenyl]}zirconium dichloride, dimethylsilylenebis{1-[2-i-propyl-4-(1-naphthyl)-4H-azulenyl]}zirconium dichloride, dimethylsilylenebis{1-[2-i-propyl-4-(4-t-butylphenyl)-4H-azulenyl]}zirconium dichloride, dimethylsilylene1-[2-methyl-4-(4-biphenylyl)-4H-azulenyl]}{1-[2-methyl-4-(4-biphenylyl) indenyl]}zirconium dichloride, dimethylsilylenebis{1-[2-ethyl-4-(4-biphenylyl)-4H-5,6,7,8-tetrahydroazulenyl]}zirconium dichloride, dimethylsilylene{1-(2-ethyl-4-phenyl-4H-azulenyl)}{1-(2-methyl-4,5-benzoindenyl))zirconium dichloride, dimethylsilylenebis{1-(2-ethyl-4-phenyl-6-isopropyl-4H-azulenyl)}zirconium dichloride, dimethylsilylenebis1-(2-ethyl-4,6-diphenyl-4H-azulenyl)}zirconium dichloride, dimethylsilylenebis[1-{2-methyl-4-(pentafluorophenyl)-4H-azulenyl}] zirconium dichloride, dimethylsilylenebis{1-(2-ethyl-4-phenyl-7-fluoro-4H-azulenyl)}zirconium dichloride, dimethylsilylenebis{1-(2-ethyl-4-indolyl-4H-azulenyl)}zirconium dichloride, dimethylsilylenebis{1-(2-dimethylborano-4-indolyl-4H-azulenyl)}zirconium dichloride, dimethylsilylenebis[1-{2-ethyl-4-(3,5-bistrifluoromethylphenyl)-4H-azulenyl}]zirconium dichloride, dimethylsilylenebis{1-(2-methyl-4-phenyl-4H-azulenyl)}zirconium dimethyl, dimethylsilylenebis{1-(2-methyl-4-phenyl-4H-azulenyl)}zirconiumbis(trifluoromethane sulfonic acid), dimethylsilylenebis{1-(2-methyl-4-phenylindenyl)} zirconium dichloride, dimethylsilylenebis{1-(2-methyl-4,5-benzoindenyl)}zirconium dichloride, dimethylsilylenebis[1-{2-methyl-4-(1-naphthyl)indenyl}]zirconium dichloride, dimethylsilylenebis{1-(2-methyl-4,6-diisopropylindenyl))zirconium dichloride, diphenylsilylenebis{1-(2-methyl-4-phenylindenyl)}zirconium dichloride, methylphenylsilylenebis{1-(2-methyl-4-phenylindenyl))zirconium dichloride, dimethylsilylenebis{1-(2-ethyl-4-phenylindenyl)}zirconium dichloride, dimethylsilylenebis[1-{2-ethyl-4-(1-naphthyl)indenyl}]zirconium dichloride, dimethylsilylenebis[1-{2-ethyl-4-(9-anthryl)indenyl}]zirconium dichloride, dimethylsilylenebis[1-{2-ethyl-4-(9-phenanthryl)indenyl}]zirconium dichloride, dimethylsilylene{1-(2-ethyl-4-phenylindenyl)}{1-(2-methyl-4,5-benzoindenyl)}zirconium dichloride, dimethylsilylenebis[1-{2-methyl-4-(pentafluorophenyl)indenyl}]zirconium dichloride, dimethylsilylenebis{1-(2-ethyl-4-phenyl-7-fluoroindenyl)}zirconium dichloride, ethylene-1,2-bis{1-(2-methyl-4-phenylindenyl)}zirconium dichloride, ethylene-1,2-bis{1-(2-ethyl-4-phenylindenyl)}zirconium dichloride, ethylene-1,2-bis[1-{2-methyl-4-(1-naphthyl)indenyl}]zirconium dichloride, isopropylidenebis{1-(2-methyl-4-phenylindenyl)}zirconium dichloride, ethylene-1,2-bis[1-(2-methyl-4-phenyl-4H-azulenyl)}zirconium dichloride, ethylene-1,2-bis{1-(2-ethyl-4-phenyl-4H-azulenyl))zirconium dichloride, ethylene-1,2-bis[1-(2-methyl-4-(1-naphthyl)indenyl}]zirconium dichloride, ethylene-1,2-bis[1-{2-methyl-4-(4-chlorophenyl)-4H-azulenyl}]zirconium dichloride, isopropylidenebis{1-(2-methyl-4-phenyl-4H-azulenyl)}zirconium dichloride, ethylene-1,2-bis{1-(2-ethyl-4-indolyl-4H-azulenyl)}zirconium dichloride, dimethylgelmylenebis{1-(2-methyl-4-phenylindenyl)}zirconium dichloride, dimethylgelmylenebis{1-(2-ethyl-4-phenylindenyl))zirconium dichloride, methyl aluminum bis{1-(2-ethyl-4-phenylindenyl)}zirconium dichloride, phenylphosphinobis{1-(2-ethyl-4-phenylindenyl)}zirconium dichloride, phenylaminobis{l-(2-methyl-4-phenylindenyl)}zirconium dichloride, and the like.

(c) Examples of a compound expressed by the formula (3) include (tetramethylcyclopentadienyl)titanium(bis t-butylamide)dichloride, (tetramethylcyclopentadienyl) titanium(bisisopropylamide) dichloride, (tetramethylcyclopentadienyl)titanium (biscyclododecylamid e)dichloride, (tetramethylcyclopentadienyl)titanium{bis (trimethylsilyl) amide}dichloride, (2-methyl-4-phenyl-4H-azulenyl)titanium{bis(trimethylsilyl) amide}dichloride, (2-methyl-4-phenyl-4H-azulenyl) zirconium{bis(trimethylsilyl)amide}dichloride, (2-methylindenyl)titanium(bis t-butylamide) dichloride, (fluorenyl)titanium(bis t-butylamide) dichloride, (3,6-diisopropylfluorenyl)titanium(bis t-butylamide)dichloride, (tetramethylcyclopentadienyl) titanium(phenoxide)dichlorid e, (tetramethylcyclopentadienyl)titanium(2,6-diisopropylphenoxide)dichloride, and the like.

(d) Examples of a compound expressed by the formula (4) include dimethylsilanediil(tetramethylcyclopentadienyl)(t-butylamide)titanium dichloride, dimethylsilanediil(tetramethylcyclopentadienyl)(cyclodode cylamide) titanium dichloride, dimethylsilanediil(2-methylindenyl)(t-butylamide)titanium dichloride, dimethylsilanediil(fluorenyl)(t-butylamide)titanium dichloride, and the like.

Component (A) expressed by the formulae (1) to (4) may be used in a mixture of two or more compounds expressed by the same formula and/or different formula.

Component (C)

Component (C) is an organic aluminum compound, and is optionally used. A compound expressed by the following formula (5) is preferably used.

$$AlR^4{}_pX_{3-p} \qquad \text{Formula (5)}$$

wherein $R^4$ is a $C_1$–$C_{20}$ hydrocarbon group, and X is halogen, hydrogen, an alkoxy group or an amino group, and p is in a range of from 1 to 3.

$R^4$ is preferably an alkyl group, and X is preferably chlorine, when it is halogen, a $C_1$–$C_8$ alkoxy group when it is an alkoxy group, and a $C_1$–$C_8$ amino group when it is an amino group.

In the present invention, a compound expressed by this formula may be used alone or in a mixture or in a combination of a plurality of compounds. This can be used not only at the time of preparing a catalyst but also at the time of prepolymerization or polymerization.

Accordingly, preferable compound examples include trimethylaluminum, triethylaluminum, tri n-propylaluminum, tri n-butylaluminum, triisobutylaluminum, tri n-hexylaluminum, tri n-octylaluminum, tri n-decylaluminum, diethylaluminum chloride, diethylaluminum sesqui chloride, diethylaluminum hydride, diethylaluminum ethoxide, diethylaluminum dimethylamide, diisobutylaluminum hydride, diisobutylaluminum chloride, and the like. Among them, preferable examples include a trialkylaluminum wherein p=3, a dialkylaluminum hydride wherein p=2 and X=hydrogen, and the like. More preferable examples include a trialkylaluminum wherein $R^4$ has a carbon number of from 1 to 8, and most preferable example is triisobutylaluminum.

(Preparation of Catalyst)

A catalyst of the present invention can be formed by contacting the above respective components in the outside of a polymerization reactor or the inside of the polymerization reactor at the same time or continuously or by one time or a plurality of times. It is usual to carry out the contacting treatment of respective components in a solvent of an aliphatic hydrocarbon or an aromatic hydrocarbon. A contacting temperature is not specially limited, but is preferably from −20° C. to 150° C. Depending on an aimed object, an optional combination can be employed as a contacting order, but a preferable contacting order with regard to the respective components is illustrated below. Usually, component (B) is contacted with component (A) at first. Addition of component (C) to component (B) may be carried out before contacting with component (A) or at the same time or after contacting with component (A), but it is preferable to add component (C) to component (B) at the same time as contacting with component (A) or after contacting with component (A). After contacting the respective components, it is possible to wash with an aliphatic hydrocarbon or aromatic hydrocarbon solvent.

Respective amounts of components (A), (B) and (C) used in the present invention are optional. For example, an amount of component (A) to component (B) is preferably from 0.1 to 1,000 $\mu$mol, more preferably from 0.5 to 500 $\mu$mol to 1 g of component (B). An amount of component (C) to component (B) is preferably from 0.001 to 100 $\mu$mol, preferably from 0.005 to 50 $\mu$mol, in terms of an amount of a transition metal, to 1 g of component (B). Accordingly, an amount of component (C) to component (A) is preferably from 0–5 to 50, more preferably from $10^{-4}$ to 5 in terms of a mol ratio of a transition metal.

(Prepolymerization Catalyst)

The catalyst of the present invention may be subjected to prepolymerization treatment by contacting the catalyst with a polymerizable monomer to polymerize a small amount of monomer, and it is preferable to employ the prepolymerization treatment. It is usual to employ milder conditions for the prepolymerization treatment than conditions of main polymerization. As a prepolymerization monomer, α-olefin, preferably ethylene or propylene, is usable. A prepolymerized polymer amount is usually from 0.01 to 100 g/g-catalyst, preferably from 0.1 to 50 g/g-catalyst, more preferably from 1 to 30 g/g-catalyst, most preferably from 1.5 to 5 g/g-catalyst. If this amount is too small, powder properties of a polymer obtained become poor, and if this amount is too large, it is not preferable from economical viewpoint.

The prepolymerization catalyst is obtained by combining the above-mentioned components (A) and (B), and an organic aluminum compound (hereinafter, an organic aluminum compound used for prepolymerization is referred to as "organic AL (2)") used optionally if desired. The component (A) is a metallocene compound and the component (B) is an ion-exchange layered silicate. The ion-exchange layered silicate of the component (B) may be such various embodiments as fully described in the paragraph "catalyst component for olefin polymerization". However, it is preferable to use a catalyst having a specific structure obtained by combining the above-mentioned specific treatments. A specific structure means to have "feature 1" and "feature 2", and preferably to have, in addition to these features, at least one property selected from "feature 3" and "feature 5 to feature 9". The organic AL (2) is not specially limited, but the same material as the above-mentioned component (C) is suitable.

Preferable embodiments of the prepolymerization catalyst to achieve the effect of the present invention are illustrated as the following embodiments (1) to (5). (1) It is important that prepolymerization catalyst particles obtained by contacting a metallocene catalyst supported on an ion-exchange layered silicate with olefin have the following "feature 4".

Feature 4: A prepolymerization homogenization index (H value) obtained by subjecting respective catalyst particles before prepolymerization and after prepolymerization to fluorescence observation is at most 60%.

An ion-exchange layered silicate mentioned herein is not specially limited, and such various silicates as fully described with regard to "catalyst component for olefin polymerization" as component (B) are usable.

The present inventors have carried out morphological analysis of a prepolymerization catalyst to study relation between polymer properties and outer appearance of a product, and as this result, it has been discovered that (a) a agglomerated material of polymer particles obtained by polymerization and (b) catalyst particles causing a poor outer appearance of a product such as fish eyes and gel have clear characteristics. It has been discovered that the problems of the present invention can be solved by reducing such particles, and the present invention has been accomplished on the basis of this discovery.

It is a well known technique to prepolymerize a metallocene catalyst, but its solving means was simply to change a kind of each catalyst component or prepolymerization conditions. As far as the present inventors know, there was no example of solving the above-mentioned problems of a prepolymerization catalyst from a morphological viewpoint. In the present invention, the prepolymerization catalyst has been studied from its morphological viewpoint.

Fluorescence analysis is employed as a means for analyzing the morphology. Particles before prepolymerization emit a fluorescent light, but its fluorescent light density varies after the prepolymerization. The fluorescent light density means a fluorescent light intensity emitted when applying UV rays to a catalyst. An H value which is a morphological index is expressed by percentage indicating a proportion of a number of "fluorescent light-emitting particles" present among prepolymerization catalyst particles. The "fluorescent light-emitting particles" are defined as catalyst particles having a fluorescent light density of at least 1 after prepolymerization when an average fluorescent light density of catalyst particles before prepolymerization is defined to be 1.

Catalyst particles causing agglomeration of polymerization powder are (a) particles having a low prepolymerization degree per piece of particle or (b) particles having a part of low prepolymerization degree remained within particle.

These particles are clearly characterized by subjecting a catalyst to fluorescence observation. Their characteristics and a mechanism of exhibiting the characteristics are estimated as mentioned below.

(a) Particles Having a Low Prepolymerization Degree per Piece of Particle

When carrying out fluorescence observation, these particles are characterized by having a fluorescent light density not lower than a fluorescent light density of catalyst particles before prepolymerization. A mechanism that the catalyst emits a fluorescent light is not clear, but it is estimated that the fluorescent light is emitted from a component of an organic metal compound which becomes an active site when considering an inorganic carrier before contacting with the organic metal compound (such as a metallocene compound) which becomes an active site does not substantially emit a fluorescent light and a catalyst after contacting with the organic metal compound emits a fluorescent light.

A fluorescent light density varies depending on a prepolymerization degree of particles, and the fluorescent light density becomes larger at a stage of low prepolymerization degree than that of a catalyst before prepolymerization. The stage of low prepolymerization degree is a stage in which a volume of a prepolymerization polymer is smaller than a pore volume of an inorganic carrier, and at this stage, the prepolymerization polymer is accumulated within pores of the inorganic carrier and this is a stage in which the inorganic carrier is not crushed nor dispersed.

At such a stage that the prepolymerization polymer is being filled in these pores, fluorescence observation shows that the catalyst provides a fluorescent light density higher than that before prepolymerization.

When the prepolymerization proceeds further, a volume of the prepolymerization polymer becomes larger than the pore volume of the inorganic carrier, and in proportion to growth of the polymer, the inorganic carrier is crushed and dispersed. At this proceeded stage, the component (organic metal compound) emitting a fluorescent light is going to be dispersed in the prepolymerization polymer in accordance with dispersion of the inorganic carrier, and a density of the component (organic metal compound) emitting a fluorescent light present per unit volume becomes smaller as the prepolymerization degree becomes larger. Consequently, a fluorescent light density becomes smaller.

However, not all of catalyst particles grow until this stage, and growth of a part of particles are suspended at a stage of low prepolymerization degree depending on prepolymerization conditions. These particles provide a poor outer appearance of a product due to poor particle properties, fish eyes or gel. The present invention solves the above-mentioned problems by providing a prepolymerization catalyst having a uniform prepolymerization degree among particles.

(b) Particles Having a Part of Low Prepolymerization Degree Remained at a Part Within Particle Depending on prepolymerization conditions, particles having a part of low prepolymerization degree remained at a part within catalyst particle are formed. This is because when rapid prepolymerization is carried out, diffusion of a monomer is not sufficiently developed in the inside of a particle, and prepolymerization proceeds only on the surface. According to fluorescence observation of these particles, a fluorescent light density of the part of low prepolymerization degree becomes higher than that of a catalyst before prepolymerization, and other part provides a low fluorescent light density. The reason why the part of low prepolymerization degree provides a higher fluorescent light density is the same as described in the above paragraph (a), and it is considered that this is because a density of a component (organic metal compound) providing a fluorescent light present per unit volume is high. Powders having these characteristics also cause a bad outer appearance of a product due to poor powder properties, fish eyes and gel.

As described in the above paragraph (b), the present invention solves the above problems by providing a catalyst having whole particle of each particle uniformly fully polymerized.

Comparison of Fluorescent Light Density of Catalyst Particle after Prepolymerization The present invention is characterized in that there are present only a small number of catalyst particles (fluorescent light-emitting particles) after prepolymerization, the fluorescent light density of which is at least 1 to a fluorescent light density of catalyst particles before prepolymerization. That is, a proportion (H value) of a number of catalyst particles after prepolymerization, the fluorescent light density of which is at least 1 to a fluorescent light density of catalyst particles before prepolymerization, is at most 60% to a number of whole catalyst particles after prepolymerization.

Thus, it is preferable that a number of fluorescent light-emitting particles is smaller, and an H value is preferably at most 50%, more preferably at most 40%, most preferably at most 30%.

The fluorescent light density is an intensity of fluorescent light emitted when UV rays are applied to a catalyst, and is evaluated by a brightness of fluorescence microscope photograph. On the basis of a fluorescent photograph of a catalyst before prepolymerization taken by the following method, largeness and smallness of a fluorescent light density are evaluated by comparing a brightness between this photograph and a photograph of a catalyst after prepolymerization. As the brightness is higher, the fluorescent light density becomes large. Comparison of the brightness can be visually made, but it can be made by using an image-analyzing apparatus using a computer.

Observation Conditions by Microscope

Both fluorescent light observation and transmitting light observation are carried out by bathing a sample in liquid paraffin. An ordinary catalyst is deactivated when contacting with air, but the measurement can be made even when the sample is deactivated.

It is necessary to select photographing conditions of a fluorescent light photograph in such a manner as to be able to evaluate largeness and smallness of a fluorescent light density of catalyst particles after prepolymerization as compared with a fluorescent light density of particles before prepolymerization. In order to make evaluation easier, it is possible to select conditions so as not to be photosensitive when a fluorescent light density is smaller than that of a catalyst before prepolymerization.

Fluorescent Light Density of Catalyst Particles Before Prepolymerization

First, a transparent light photograph of a catalyst before prepolymerization is taken and a number of particles is calculated within its visual field and then a fluorescent light photograph is taken in the same visual field.

With regard to a catalyst before prepolymerization, any particle and any part within a particle have substantially the same fluorescent light density per area, but when an intensity varies depending on a particle of catalyst particles before prepolymerization, their average value is employed. It is preferable to use an image-treating apparatus for calculating an average value.

It is preferable that there are at least 50 pieces of particles in the same visual field, but if it is difficult to taken such a photograph depending on a particle size or dispersibility of a catalyst, a plurality of photographs are taken under the same conditions, and at least 50 pieces of particles are evaluated.

A catalyst before prepolymerization for measuring a fluorescent light density may be employed by taking a part thereof in the process of obtaining a catalyst after prepolymerization, or a catalyst may be separately prepared under the same conditions as in the preparation of a catalyst after prepolymerization but without carrying out a prepolymerization step.

Fluorescent Light Density of Catalyst Particles After Prepolymerization

In the same manner as above, a transmitting light photograph of a catalyst after prepolymerization is taken first, and a number of particles within the visual field are calculated and an area of each particle on the photograph is determined from the transmitting light photograph. Further, a fluorescent light photograph is taken under the same conditions as in the case of the catalyst before prepolymerization to look for fluorescent light-emitting particles.

Depending on particles after prepolymerization, there is a case that only a part of each particle emits a fluorescent light. In such a case, as an evaluation standard as to whether that is a fluorescent light-emitting particle or not, a particle having an effective fluorescent light-emitting part area of at least $1/100$ to an area of the particle on the transmitting light photograph is judged to be a fluorescent light-emitting particle. In this manner, with regard to 50 pieces of particles, their fluorescent light density is compared with that of a catalyst before prepolymerization. Crushed catalyst or fine powder-like catalyst particles are not preferable as a catalyst for polymerization, and if such particles are added to be measured, a number of particles to be measured is increased and consequently an H value becomes a lower value, thus apparently exhibiting a favorable measurement result. In order to remove this influence, catalyst particles having a particle size of at most $1/4$ of an average catalyst particle size are not calculated.

Fluorescence Microscope

A fluorescence microscope employed is a fluorescence microscope as described at page 421 of "Rikougaku Jiten" edited by Tokyo Rika Daigaku Rikougaku Jiten Henshuu Iinkai or at pages 70 to 74 of "Kenbikyou no Ohanashi" by Kentarou Asakura. Examples of a fluorescence microscope include a transmission fluorescence microscope and a reflection fluorescence microscope, and the reflection fluorescence microscope is employed for observation in the present specification. Also, it is preferable for preventing a sample from being damaged to make the time of applying a fluorescent light to a sample shorter, and the measurement is finished preferably within at most 5 minutes, more preferably within at most 1 minute.

A catalyst component and prepolymerization conditions to be used are not specially limited as far as a prepolymerization catalyst having the above-mentioned feature 4 can be obtained.

(a) A prepolymerization catalyst having feature 4 can be obtained by using a silicate having a specific structure formed by combining such specific treatments as described in the above paragraph "Catalyst component for olefin polymerization". The specific structure means to have feature 1 and feature 2, preferably further to have at least one property selected from the group consisting of feature 3 and feature 5 to feature 9, in addition thereto.

(b) Also, a prepolymerization catalyst having feature 4 can be obtained by employing at least one of the following procedures (2) to (5).

Further, it is effective to combine the above methods (a) and (b).

(2) It is important to employ specific prepolymerization conditions.

According to prior arts, there was no disclosure concerning a knowledge to associate with a polymerization performance of a catalyst obtained in relation to a feeding method of a monomer in prepolymerization. It has been discovered in the present invention that a feeding method of olefin in prepolymerization system provides an important influence on a catalyst performance, and the above-mentioned problems of the present invention have been solved on the basis of this discovery.

That is, the present invention relates to a catalyst for olefin polymerization, which is a prepolymerization catalyst obtained by contacting a metallocene catalyst supported on an ion-exchange layered silicate with olefin, wherein the catalyst is obtained by (b) maintaining a polymer-forming rate at most 10 mg/min per g of the ion-exchange layered silicate (a) until a prepolymerized polymer in an amount of corresponding to a pore volume of the ion-exchange layered silicate is formed.

The above metallocene catalyst supported is obtained by combining the above-mentioned components (A) and (B). The component (A) is a metallocene compound and the component (B) is an ion-exchange layered silicate. Various types of materials as fully described in the above paragraph "catalyst component for olefin polymerization" can be used as the ion-exchange layered silicate of the component (B). However, it is preferable to use a carrier having a specific structure obtained by combining the above-mentioned specific treatments. The specific structure has "feature 1" and "feature 2", and in addition to these properties, preferably has at least one property selected from "feature 3" and "feature 5 to feature 9".

Generally, olefin polymerization of a catalyst supported on a carrier takes a step wherein catalyst particles collapse in accordance with growth of polymer particles. If a growth speed of polymer particles and a collapse speed of carriers are not well balanced, collapse of particles and generation of fine powder are caused. From this point of view, it is necessary to carry out prepolymerization in a good balance with a carrier strength in order to prevent growth of non-uniform particles. Particularly, since an ion-exchange layered silicate has a cleavage property, a balance between a growth speed of polymer particles and a collapse speed of carriers has a large influence on catalyst performances. The present inventors considered this point very important.

The polymer growth speed in prepolymerization can be adjusted by controlling reaction conditions including an olefin concentration, a component (A) concentration, an organic AL (2) concentration, a slurry concentration of a catalyst component, a prepolymerization temperature, a prepolymerization pressure and the like. For example, it is convenient for this purpose to control a rate of supplying olefin to polymerization system, an olefin partial pressure and the like.

Olefin may be any form of liquid or gas in the prepolymerization system. Olefin may be introduced previously in a specific-amount into a reactor before prepolymerization, or may be supplied step by step or continuously, but it is preferable to supply olefin step by step or continuously. Particularly, when supplying olefin step by step or continuously, a feeding rate per hour of olefin is usually from 0.001 to 100 g, preferably from 0.01 to 10 g, per g of component (B). More particularly, the feeding of olefin may be suspended intermittently during prepolymerization, or the feeding rate may be varied as a lapse of time. Also, it is possible to use hydrogen together with olefin for adjusting a molecular weight if necessary. Also, it is possible to control the reaction by using an inert gas such as nitrogen, lowering a pressure by purging during the reaction, diluting with an inert solvent or varying a prepolymerization temperature to adjust a polymer-forming rate.

When carrying out prepolymerization in accordance with a slurry polymerization method in an inert solvent, a component (A) concentration is usually from 0.001 to 100 $\mu$mol/mL, preferably from 0.01 to 10 $\mu$mol/mL. In the same manner, a component (B) concentration is usually from 0.001 to 100 g/mL, preferably from 0.005 to 10 g/mL. Also, an organic AL (2) concentration is usually from 0.01 to 1,000 $\mu$mol/mL, preferably from 0.1 to 100 $\mu$mol/mL.

Prepolymerization by contacting the above catalyst component with olefin is carried out at a temperature in a range of usually from −50° C. to 100° C., preferably from 0° C. to 90° C. Particularly, when an olefin concentration is high, the temperature employed is preferably lower to control the reaction. The temperature may be constant, but may be varied as a lapse of time. Particularly, in the initial stage of prepolymerization, it is preferable not to make a polymerization speed higher, and thus, it is preferable that the prepolymerization is initiated at a relatively low temperature and the temperature is then raised.

Also, it is possible to control a polymer-forming rate by selecting a kind of olefin. In the present invention, particularly in the initial stage of prepolymerization, the above-described prepolymerization conditions are appropriately selected to maintain a polymer-forming rate at a proper value, and this control can be more easily made by combining at least two of a plurality of conditions.

It is necessary for the prepolymerization of the present invention to maintain a polymer-forming rate at most 10 mg/min per g of component (B) until a prepolymerized polymer is formed in an amount corresponding to a pore volume of the component (B). After forming a prepolymerized polymer in an amount corresponding to the pore volume of the component (B), a polymer-forming rate is not specially limited. The prepolymerization of the present invention is characterized by being precisely controlled at the initial stage. For example, in case of batch-wise operation, it is necessary to precisely control at the initial stage for 100 minutes, particularly for 50 minutes, from the initiation of polymerization. Also, in case of continuous operation, it is necessary to precisely control at the initial zone for 100 minutes, particularly for 50 minutes, of the retention time.

As mentioned above, the pore volume of the component (B) is varied depending on a kind of an ion-exchange layered silicate or a treating method employed, but it is usually from 0.2 to 2.0 cm$^3$/g. Accordingly, by taking an amount of component (B) used and its pore volume into consideration, a polymer-forming rate and an amount to be formed in the prepolymerization are controlled.

Prepolymerization Activity Pattern

A polymer-forming rate may be at most 10 mg/min as a polymer-forming rate per g of component (B). If the forming rate exceeds 10 mg/g·min, a prepolymerized polymer is non-uniformly formed, and a polymerization active site of a catalyst is hardly increased. A large 10 amount of polymer is locally formed, which causes agglomeration of the catalyst component. According to the present inventors' knowledge, in order to increase a polymerization active site of a catalyst, it is required that an ion-exchange layered silicate is gradually crushed by a formed polymer and its surface area is increased in the step of prepolymerization. The lower limit of a polymerization rate is not specially limited, but if it is too low, a long time is necessary for prepolymerization treatment, and it is not industrially favorable. Accordingly, the polymerization rate is selected preferably in a range of from 1 to 10 mg/g·min, particularly from 2 to 8 mg/g·min.

A polymer-forming rate is not always necessary to be constant as far as it is at most 10 mg/g·min until a prepolymerized polymer is formed in an amount corresponding to a pore volume of component (B). If it is at most 10 mg/g·min, any combination of a constant rate, an increasing rate or a decreasing rate may be employed. As mentioned above, after forming a prepolymerized polymer in an amount corresponding to a pore volume of component (B), a polymer-forming rate is not specially limited. When carrying out prepolymerization in batch-wise manner, a remaining olefin monomer may be purged or all remaining monomers may be polymerized in a short time by raising a temperature.

Hereinafter, a forming rate of prepolymerization polymer (prepolymerization activity pattern) is explained with reference to various embodiments illustrated in the drawings.

Figure 5:
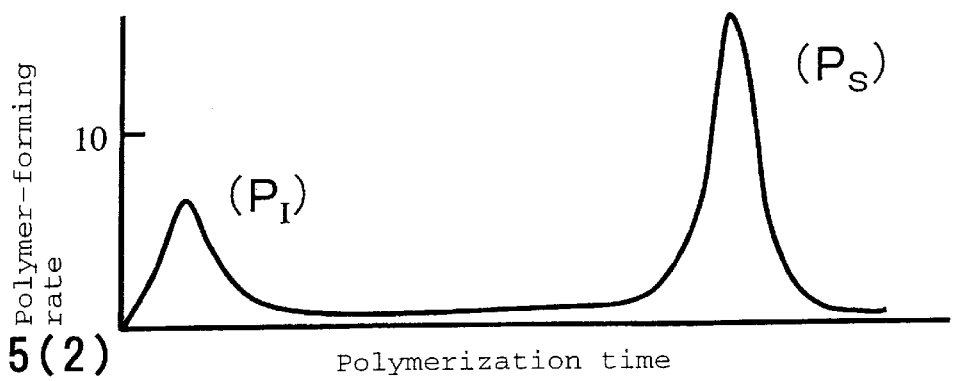
FIG. 5 illustrates various states of prepolymerization activity patterns.
Figure 5:
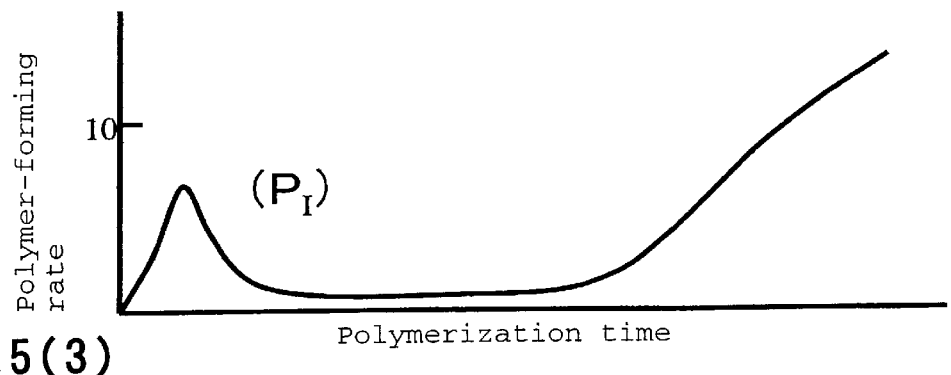
Figure 5:
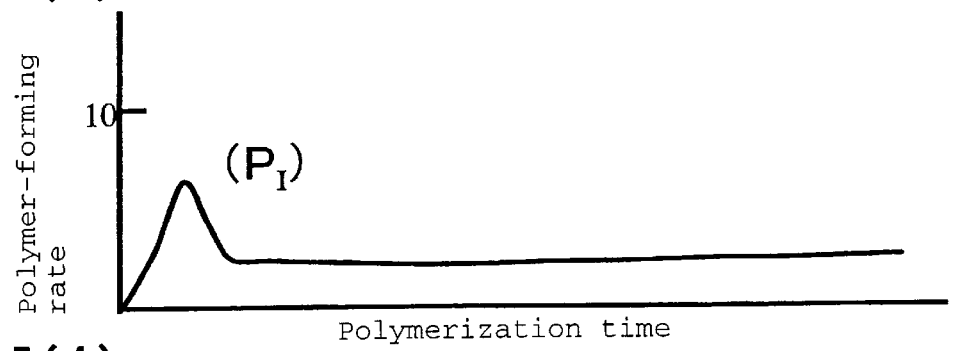
Figure 5:
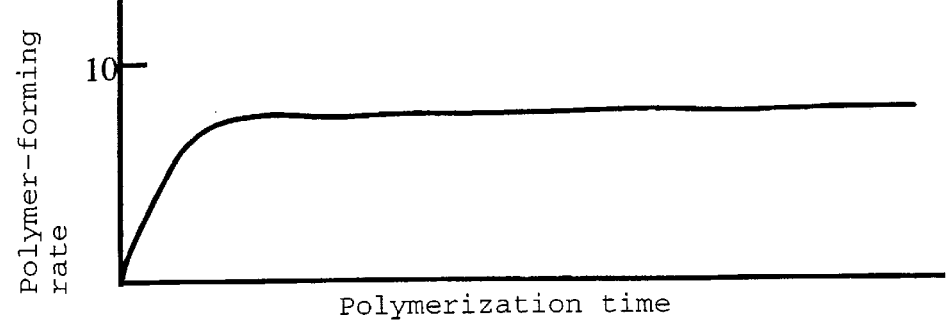

FIG. 5 illustrates prepolymerization activity patterns (simply referred to as "prepolymerization pattern") by batch-wise method. The axis of abscissas indicates a polymerization time (minute) and the axis of ordinates indicates a forming rate of a prepolymerized polymer (g-polymer/g-B component-min). Also, (PI) indicates an initial stage polymerization peak and (Ps) indicates a latter stage polymerization peak.

FIG. 5 illustrates patterns (1) to (4), and pattern (1) illustrates a pattern wherein after supplying a small amount of a monomer to a prepolymerization system, the supplying of a monomer is suspended half way. A considerable amount of a polymer is formed in the initial stage of prepolymerization, and the formation of a polymer is then decreased and thereafter a polymer is formed at almost constant level. In the latter stage of prepolymerization, collapse of catalyst component (B) proceeds and an active site is rapidly increased, and a polymer-forming rate reaches a peak. Thereafter, a remaining monomer disappears, and an amount of a polymer formed reaches 0.

Pattern (2) illustrates a pattern wherein after supplying a small amount of a monomer to a prepolymerization system, the supplying of a monomer is suspended half way once. After a lapse of a predetermined time, a large amount of a monomer is supplied, and further after a lapse of a predetermined time, a remaining monomer is compulsorily purged to finish the prepolymerization. Since a large amount of a monomer is present at the latter stage of prepolymerization, a polymer-forming rate reaches maximum at the end of polymerization.

Pattern (3) illustrates a pattern wherein after supplying a small amount of a monomer to a prepolymerization system, the supplying of a monomer is reduced half way in such a manner as to make a polymer-forming rate constant. Since a polymerization activity of a catalyst is increased in the latter stage of prepolymerization, an amount of a monomer supplied is reduced in the latter stage of prepolymerization as compared with the former stage. When a monomer is supplied in a constant amount, a prepolymerization temperature is lowered or a catalyst concentration is lowered so as to prevent excessive polymerization of the supplied monomer. Also, since a prepolymerization activity correlates to a monomer partial pressure or temperature, there is a case in which a supplied amount of a monomer and a pressure are in an equilibrium relation depending on conditions, and such a case provides this pattern without intentionally reducing a supplied amount of monomer.

Pattern (4) illustrates a model pattern wherein after supplying a small amount of a monomer to a prepolymerization system, conditions of the prepolymerization are changed half way and operation is made in such a manner as to maintain a polymer-forming rate in the vicinity of the maximum value of the initial stage.

In any case of patterns (1) to (3), a polymer-forming rate reaches a peak (PI) in the initial stage of prepolymerization, and is then once lowered. The polymer-forming rate at this peak ($P_I$) is maintained at most 10 mg/g·min per g of component (B). The polymer-forming rate is rapidly increased in the latter stage of prepolymerization, and reaches a peak ($P_S$) in some cases. The polymer-forming rate at this peak may exceed 10 mg/g·min per g of component (B). In the case of pattern (4), a polymer-forming rate is maintained constantly in the vicinity of maximum in the total range of prepolymerization.

The prepolymerization catalyst thus obtained may be used as it is in main polymerization, or may be used after washing with an inert hydrocarbon solvent. Further, the catalyst thus obtained may be dried before using.

(3) It is important to optimize an amount of an organic AL (2) used at the time of prepolymerization.

It has been discovered in the present invention that a high catalytic activity can be achieved without degrading powder properties of a polymer obtained by reducing an amount of an organic aluminum compound used substantially to 0 or only a small amount at the stage of prepolymerization, which was conventionally required in a large amount, and the present invention has been accomplished on the basis of this discovery.

An organic AL (2) used at the time of prepolymerization may be the same as component (C). An amount of an organic AL (2) used is from 0 to 10 mol, more preferably at most 8.5 mol, to 1 mol of component (A). The above-mentioned amount of an organic AL (2) indicates the whole amount of an organic aluminum compound present at the time of prepolymerization, and includes an amount of an organic AL (1) remaining in the solution, which is used for the above-mentioned treatment of silicate.

Also, an ion-exchange layered silicate mentioned herein is not specially limited, and various types of silicates may be used, which are fully described as component (B) in the above paragraph "catalyst component for olefin polymerization". However, it is preferable to use a carrier having a specific structure obtained by combining the above-mentioned specific treatments. The specific structure is to have feature 1 and feature 2, and preferably in addition to these features, at least one feature selected from feature 3 and feature 5 to feature 9.

An amount of component (B) and a ratio to component (A) and component (C) are optional, but an amount of component (A) is generally from 0.1 to 1,000 μmol, preferably from 0.5 to 500 μmol, more preferably from 1 to 100 μmol, to 1 g of component (B). Accordingly, an amount of component (C) is from 0 to 10 mmol, preferably from 0 to 4.2 mmol, more preferably from 0 to 0.90 mmol, to 1 g of component (B).

It is desirable to improve a catalytic activity, but a polymerization heat per unit time naturally becomes large. Accordingly, unless heat is effectively removed in the vicinity of a polymerization catalyst, a temperature is locally raised at a microsite, and consequently there is a fear that polymer particles agglomerate each other by dissolution or melting of a polymer. However, the efficiency of the heat removal can be controlled by using a catalyst component and/or a catalyst having the above-mentioned specific properties or a catalyst used for prepolymerization under the above-mentioned specific conditions.

Also, by combining the above-mentioned methods, the effect of the present invention can be remarkably improved. Thus, when carrying out the prepolymerization, it is preferable to employ specific conditions (a) and (b) and to adjust an amount of an organic aluminum used at the time of prepolymerization in the above-mentioned range.

That is, (b) a polymer forming rate is maintained at most 10 mg/g·min per 1 g of an ion-exchange layered silicate (a) until a prepolymerization polymer is formed in an amount corresponding to a pore volume of the ion-exchange layered silicate.

After finishing the prepolymerization, the catalyst may be used as it is depending on its used form, but it is possible to dry the catalyst if necessary. When drying the catalyst, in order to prevent the catalyst from being poisoned with impurities, it is preferable to add an organic aluminum compound having the same structure as component (C).

During contacting the above-mentioned respective components or after contacting, or after finishing the prepolymerization or after drying the prepolymerization catalyst, a solid material including a polymer such as polyethylene, polypropylene or the like, and an inorganic oxide such as silica, titanium or the like, may be coexisted or may be contacted therewith. Also, it is possible to employ a method of contacting component (C) after contacting all the catalyst components of the present invention or after carrying out the prepolymerization.

(4) When forming a prepolymerization catalyst, it is important to have a new additional metallocene complex contacted with a metallocene catalyst on a carrier.

As mentioned above, in the present invention, component (A) and component (C) optionally used, together with a metallocene catalyst supported on component (B), are contacted with olefin to form a prepolymerization catalyst. As mentioned above, in the prepolymerization step, by accumulation of a prepolymerized polymer, collapse and dispersion of component (B) proceeds and a surface area is increased. In proportion to the procedure of prepolymerization, a polymerization active site is formed on the dispersed component (B) by contacting with component (A), and an active site precursor structure is newly formed.

In the present invention, formation of a new active site on the active site precursor structure is accelerated by contacting (a) a new metallocene complex and (b) a new organic aluminum compound optionally used with the metallocene catalyst effecting prepolymerization, and a uniform prepolymerization catalyst in which component (B) is highly dispersed, can be provided by reducing particles having a low prepolymerization degree (growth is suspended) or removing a part of low prepolymerization degree within a particle, thus accomplishing the present invention.

A new metallocene complex added during the prepolymerization step to be contacted with the metallocene catalyst effecting prepolymerization may be the same or different from a component defined as a metallocene complex already supported as component (A), and its amount used is selected in such a manner as to make the total amount of component (A) and a new metallocene complex in a range of the above-mentioned amount of component (A) used to component (B). A mol ratio of component (A) and a new metallocene complex is optional, but preferably 1:0.01–1:100, more preferably 1:0.1–1:10.

Also, a new organic aluminum compound optionally used may be the same or different from a compound defined as component (C), and its amount used may be defined also in the same manner.

Contacting of the metallocene catalyst effecting prepolymerization with (a) a new metallocene complex and (b) a new organic aluminum compound optionally used, may be carried out at an optional time during the prepolymerization step carried out by contacting the metallocene catalyst with olefin under the above-mentioned prepolymerization conditions. Thus, the contacting may be carried out in the presence of olefin or in the absence of olefin by once suspending the prepolymerization. Preferably, the contacting is carried out after a prepolymerized polymer is formed in an amount sufficiently larger to collapse or disperse component (B). For example, it is necessary to optimize by taking a pore volume, a pore size distribution and a carrier strength of component (B) used into consideration, but the contacting is carried out usually after forming a prepolymerized polymer in an amount of at least 0.1 g, preferably at least 0.2 g, more preferably at least 0.5 g, per 1 g of component (B). In order to fully achieve an effect by a new metallocene complex, prepolymerization is carried out until a prepolymerized polymer is further formed in an amount of at least 0.5 g, preferably at least 1.0 g, more preferably at least 2.0 g, per 1 g of component (B).

(5) In the formation of a prepolymerization catalyst, it is important to subject a metallocene catalyst on a carrier prepared under specific conditions to slurry-washing with an inert hydrocarbon solvent or liquefied α-olefin and then to carry out olefin prepolymerization.

In the step of preparing a metallocene catalyst on a carrier by contacting component (A) and component (C) optionally used with component (B), it is necessary to optimize the contacting conditions to form an active site by having the component (A) fully supported on the component (B), and this is desirable for forming a uniform prepolymerization catalyst. For example, it is necessary to take a sufficient contacting time for completely effecting the carrying reaction. However, according to extension of the contacting time, degeneration of component (A) as a side reaction also proceeds, and consequently non-uniform prepolymerization is caused. Further, component (A) adsorbed in a carrier during prepolymerization without being supported on component (B) causes formation of a deposited polymer during main polymerization.

Thus, the present invention is accomplished by providing a uniform prepolymerization catalyst having component (B) highly dispersed, which is obtained by the steps of (a) proceeding the carrying reaction by contacting component (A) with component (B) for at least 30 minutes, (b) slurry washing the contacted material obtained by the above operation (a) with an inert hydrocarbon solvent or liquefied α-olefin to remove a byproduct derived from component (A) and (c) carrying out olefin prepolymerization with the washed material obtained by the above operation (b) to remove particles having a low prepolymerization degree or to remove a part of low prepolymerization degree in a particle.

The contacting operation of component (A) and component (B) is carried out under such conditions as described in the above paragraph "preparation of catalyst", but the contacting time is preferably at least 30 minutes, more preferably at least one hour. The contacting temperature is not specially limited, but it is necessary to avoid such a high contacting temperature as to cause degeneration reaction of component (A), and it is preferable to employ a contacting temperature of at most 100° C., preferably at most 80° C., more preferably at most 60° C.

(Use of Catalyst/Polymerization of Olefin)

As a polymerizable α-olefin, a $C_2$–$C_{20}$ olefin is preferable, examples of which include ethylene, propylene, 1-butene, 1-hexene, 1-octene and the like. In case of copolymerization, a kind of a comonomer used may be α-olefin selected from the above illustrated α-olefins, which is other than the main component. An amount of a comonomer is selected under such conditions as to produce a polymer having desirable physical properties (in respect of a melting point, a molecular weight, a stiffness, or the like), and is more effectively selected so as to provide a low melting point polymer.

Any polymerization system may be employed as far as a catalyst component and each monomer are efficiently contacted. For example, a slurry method using an inert solvent, a solution polymerization method, a bulk method employing propylene as a solvent substantially without using an inert solvent, or a gas phase method maintaining each monomer in a gas state substantially without using a liquid solvent may be employed. Also, they are applied to continuous polymerization or batch-wise polymerization. In case of slurry polymerization, a saturated aliphatic hydrocarbon or an aromatic hydrocarbon such as hexane, heptane, pentane, cyclohexane, benzene, toluene or the like may be used alone or in a mixture as a polymerization solvent. A polymerization temperature is from 0 to 200° C., and as a molecular weight-regulating agent, hydrogen may be assistantly used. An operatable polymerization pressure is from 0 to 2,000 $kg/cm^2G$.

Also, a metallocene catalyst of the present invention is used preferably for producing a random copolymer, and is particularly suitable for producing a propylene-ethylene copolymer. Also, it is suitable for producing a low melting point polymer, and is particularly suitable for producing a propylene-ethylene random copolymer having a melting point of at most 140° C., preferably at most 135° C., more preferably at most 130° C., most preferably at most 125° C.

The present invention is further illustrated with reference to the following Examples, but should not be limited thereto.

In the following Examples and Comparative Examples, physical properties were evaluated in the following manner.

(1) Composition Analysis of Ion-Exchange Layered Silicate

Chemical analysis is carried out in accordance with JIS method to prepare an analytical curve, and determination is carried out with fluorescent X-rays.

(2) Measurement of Pore Size

Measurement conditions of pore size distribution by nitrogen adsorption-desorption method are illustrated.

Apparatus: Autosorb 3, manufactured by Quanta Chrome Company

Measurement method: gas adsorption method

Measurement conditions:

Pretreatment conditions: 200° C., 2 hours, under vacuum (at most $10^{-2}$ torr)

Sample amount: about 0.2 g

Kind of gas: nitrogen

Gas liquefaction temperature: 77 K (3) Particle Size Measurement of Ion-Exchange Layered Silicate A Laser micronizer ("LMS-24", manufactured by Seishin Kigyo K. K.) was used. Measurement was carried out by using ethanol as a dispersion medium, and a particle size distribution and an average particle size (median diameter) were calculated in terms of a refractive index of 1.33 and a shape coefficient of 1.0.

(4) MFR Measurement

A melt index value of a polypropylene type polymer was measured in accordance with JIS-K-6758, and a melt index value of a polyethylene type polymer was measured in accordance with JIS-K-6760.

(5) Polymer BD

A polymer bulk density was measured in accordance with ASTM D1895-69.

(6) Agglomerated Amount Of Polymer

By using a sieve of 1,690 μm, a polymer wt % on the sieve shaken for 10 minutes was measured.

(7) Evaluation of Bulk Density of Prepolymerization Catalyst

A bulk density was measured by flowing a solid catalyst component through a stainless-made funnel having an exit aperture diameter of 5 mm φ into a 10 cc container to measure a weight as expressed by weight per 1 cc.

(8) Evaluation of Flow Properties of Prepolymerization Catalyst

Flow properties were measured by placing 14 cc of a solid catalyst component powder into respective stainless-made funnels having a conical angle of 30° and various flow aperture diameters of 5 mm φ, 6.5 mm φ, 8 mm φ, 12 mm φ, and 20 mm φ. Numerical values indicate a minimum aperture diameter which causes flowing.

(9) Measurement of Average Crushing Strength

By using a minute compression tester "MCTM-500" manufactured by Shimadzu Corporation, crushing strengths of optionally selected at least 10 pieces of particles were measured and their average value was calculated to be a crushing strength of an inorganic carrier.

(10) Evaluation of Prepolymerization Homogenization Index (Fluorescence Microscope)

A fluorescence microscope OPTIPHOT (manufactured by Nikon Corporation) having a Epi-fluorescence attachment EDF2 (100 W mercury lamp) equipped is referred to as a fluorescence microscope. Fluorescence observation was carried out by a standard UV exciter (using UV-2A filter: excited by 330–380 nm UV rays) attached to this fluorescence microscope.

(Preparation of Microsection)

A microsection for observation was prepared by using emulsion oil TYPE DF for fluorescence observation manufactured by Nikon Corporation and inserting a sample between a commercially available slide glass and a cover glass.

(Microscopic Observation)

The above prepared microsection was observed by ordinary transmitting light observation to confirm a part wherein particles to be observed are appropriately present, and its image was recorded in accordance with the following method. Thereafter, the same visual field was observed by fluorescence observation and its image was recorded in accordance with the same method.

(Observed Image-Photographing Apparatus)

A digital microscope VH-7000 manufactured by KEYENCE Company was connected with a trinocular tube cone of the above fluorescence microscope by way of "TV Lens C-0.6X" manufactured by Nikon Corporation to record an observed image (magnification: about 150 to 300 times). Conditions of CCD of VH-7000 were gain: 0 dB (fixed), shutter speed: $\frac{1}{15}$ (fixed) and white balance: 1 PUSH. Also, image quality-improving functions were offset: −5, gain correction: +10 and gamma correction: +5.

By using a digital color printer VH-P40 manufactured by KEYENCE Company, photograph outputs were determined by printing conditions of brightness: +20 and contrast: +20 on the VH-7000 side. With regard to conditions other than the above-mentioned conditions, the initially fixed conditions for VH-7000 and VH-P40 were employed as they are.

(11) Washing Rate

A washing rate indicates a washing degree of decantation washing of a silicate of the present invention after treated with an organic aluminum compound. A total amount of an organic aluminum compound contained in a solution after reaction, were defined to be 1, and to the total amount, an amount of an organic aluminum compound remained after washing was determined in accordance with the following calculation formula. The calculation was made on the assumption that an organic aluminum compound was not separated from the solid side by the washing operation or was not adsorbed.

For example, in case of decantation washing operation, a washing rate is calculated in the following manner.

$W_1=(V_0-d_1)/(V_0+P_1)$ $W_2=(V_1-d_2)/(V_1+P_2)$ $Wn=(V_{n-1}-d_n)/V_{n-1}$

Washing rate=$W_1 \times W_2 \cdots \times W_n$ (wherein $W_n$ represents n th washing rate, $V_{n-1}$ represents a solution amount after (n−1)th washing, dn represents an extracted amount at the time of n th washing, and $P_n$ represents an added solvent amount at the time of n th washing. 0 time means the time after organic aluminum compound treatment).

(12) Melting Point (Tm)

By using DSC6200 manufactured by Seiko Instruments K. K., 5 mg of a sheet-like sample was packed into an aluminum pan, and a temperature was raised from room temperature to 200° C. at a raising speed of 100° C./min, and the temperature was maintained for 5 minutes, and the sample was then cooled to 40° C. at a cooling speed of 10° C./min to have the sample crystallized, and the sample was then heated again to 200° C. at a raising speed of 10° C./min to measure a maximum peak temperature (0° C.) of melting.

EXAMPLE 1

(Chemical Treatment of Ion-Exchange Layered Silicate)

Into a 3 L glass-made separable flask equipped with a stirring vane, 1,130 mL of distilled water was placed therein, and 750 g of concentrated sulfuric acid (96%) was slowly added thereto, and 300 g of montmorillonite (Benclay SL, manufactured by Mizusawa Industrial Chemicals, Ltd.; average particle size: 25 $\mu$m, particle size distribution: 10–60 $\mu$m, composition (wt %): Al 18.45, Mg 2.14, Fe 2.34, Si 32.8 and Na 2.62) was dispersed therein, and the resultant mixture was gradually heated to 90° C. for 1 hour, and the temperature was maintained for 5.5 hours, and the mixture was then gradually cooled to 50° C. for 1 hour. The slurry thus obtained was filtrated under a reduced pressure to obtain a cake. The cake thus obtained was washed with distilled water until the final washing water had a pH of exceeding 3.5, and the washed product was dried overnight at 110° C. under a nitrogen atmosphere.

According to nitrogen adsorption method, the product had a most frequently appearing pore diameter ($D_m$) of 101 A, a ratio of pore diameter showing ½ of a peak intensity of the most frequently appearing pore diameter ($D_{m1/2}/D_m$) of 0.76, a ratio of a pore diameter showing ⅓ of a peak intensity of the most appearing pore diameter ($D_{m1/3}/D_m$) of 0.60, and a maximum intensity of pore diameter 50 Å to the maximum intensity ($D_{V50}/D_{VM}$) of 0.26. A second peak intensity was about 30%. (Pore size distribution is illustrated in FIG. 1.) A pore volume of particles of less than 1,000 A was 0.42 cm/g, and a surface area by BET method was 225 m$^2$/g. This carrier had an average crushing strength of 13 MPa as measured by a minute compression tester.

The composition (wt %) of this chemically treated montmorillonite was Al 4.80, Mg 0.70, Fe 1.20, Si 41.2 and Na of less than detectable limit (0.2). Eluted rates of respective components were Al 55%, Mg 74%, Fe 59% and Na 93%. Mol ratios of respective components to Si were Al 0.121, Mg 0.0196, Fe 0.0146 and Na less than 0.0059.

(Preparation of Catalyst/Prepolymerization Catalyst)

The following operations were carried out by using deoxidized and dehydrated solvents and monomers under an inert gas.

The above chemically treated montmorillonite was dried at 200° C. for 2 hours under a reduced pressure. 20 g of the dried montmorillonite was introduced into a glass-made reactor having an inner volume of 1 L and a stirring paddle, heptane containing 3% of toluene (hereinafter referred to as "mixed heptane") and 84 mL of a heptane solution containing triethyl aminium (0.596 M) were added thereto, and the resultant mixture was stirred at room temperature. After 1 hour, mixture was washed with mixed heptane (washing rate<1/100) to obtain 200 mL of a silicate slurry.

Thereafter, 87 mL of mixed heptane was added to 218 mg (0.3 mmol) of (r)-dimethylsilylenebis{1-[2-methyl-4-(4-chlorophenyl)-4H-azulenyl]}zirconium dichloride, and the mixture was fully stirred, and 4.25 mL of a heptane solution of triisobutyl aluminum (0.706 M) was added thereto, and the resultant mixture was reacted at room temperature for 1 hour. Thereafter, the above prepared silicate slurry was added thereto, and the resultant mixture was stirred for 1 hour, and mixed heptane was added thereto to adjust to 500 mL.

The above prepared silicate/metallocene complex slurry was introduced into an autoclave having an inner volume of 1.0 L and a stirring system, which was fully substituted with nitrogen. When a temperature became stably 40° C., propylene was supplied thereto at a rate of 10 g/hour, and the temperature was maintained. After four hours, the supplying of propylene was stopped, and the temperature was raised to 50° C., and was then maintained for further 2 hours. A prepolymerization catalyst slurry was collected by a syphon, and about 300 mL of a supernatant liquid was removed, and the slurry was dried at 45° C. under a reduced pressure. By this operation, a prepolymerization catalyst containing 1.9 g of polypropylene per 1 g of catalyst was obtained.

Catalyst particles before prepolymerization and catalyst particles after prepolymerization were subjected to fluorescence observation to take their photographs, and were compared, and an H value was 25%.

(Propylene-Ethylene Random Polymerization)

A stirring system autoclave having an inner volume of 3 L was fully substituted with propylene, and 2.76 mL (2.02 mmol) of a triisobutyl aluminum-n-heptane solution was added therein, and 30 g of ethylene, 100 cc of hydrogen and 1,500 mL of liquid propylene were introduced therein, and a temperature was raised to 70° C. and the temperature was maintained. The previously prepared prepolymerization catalyst was made into a slurry with n-heptane, and 10 mg (except for a weight of a prepolymerized polymer) of the slurry was charged therein as a catalyst under a pressure to initiate polymerization. The tank temperature was maintained at 70° C. After 0.5 hour, 5 mL of ethanol was added therein, and a polymer obtained by purging the remaining gas was dried at 90° C. for 10 hours. As this result, 175 g of a polymer was obtained. A catalyst activity was 35,600 g-PP/g-catalyst·hour. The polymer had a bulk density (BD) of 0.45 (g/cc), an MFR value of 8.5 (dg/min) and a melting point of 126.8° C. A agglomerated polymer amount of the powder thus obtained was measured and was 0.8%.

The results are shown in the following Tables 1 and 2. Table 1 shows physical properties of an ion-exchange layered silicate and a catalyst, and Table 2 shows polymerization results.

EXAMPLE 2

(Chemical Treatment of Ion-Exchange Layered silicate)

In a 10 L separable flask, 96% sulfuric acid (3.0 kg) was added to 4.5 kg of distilled water, and Benclay SL (average particle size 25 $\mu$m, 1.2 kg) manufactured by Mizusawa Industrial Chemicals, Ltd. as an ion-exchange layered silicate (montmorillonite) was added thereto at 90° C., and the temperature was maintained to react for 5 hours. After finishing the reaction, the reaction mixture was cooled and was washed with pure water to pH 3. A solid obtained was pre-dried at 130° C. for 2 days in a nitrogen stream, and coarse particles of not smaller than 70 $\mu$m were removed. The solid was further dried at 200° C. in a nitrogen stream to obtain 0.80 kg of chemically treated smectite. The chemically treated smectite thus obtained had a composition of Al: 4.0 wt %, Si: 38.8 wt %, Mg: 0.60 wt %, Fe: 1.3 wt % and Na<0.2 wt %, and Al/Si=0.107 (mol/mol). This carrier had an average crushing strength of 11 MPa as measured by a minute compression tester.

Figure 2:
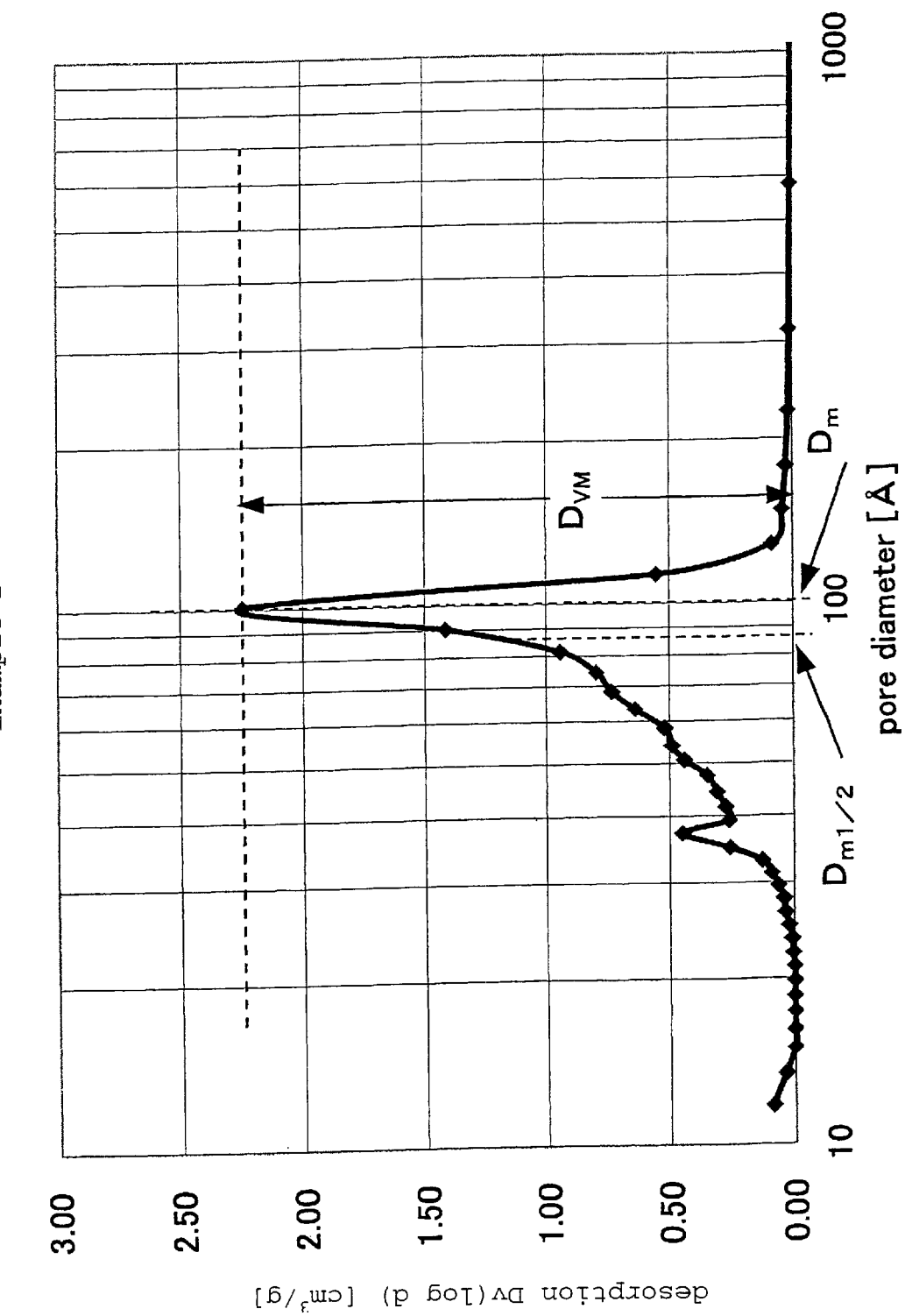
FIG. 2 illustrates a pore size distribution curve of an ion-exchange layered silicate used in Example 2.

This carrier had a frequently appearing pore diameter ($D_m$) of 101 Å by nitrogen adsorption method, a ratio of pore diameter showing ½ of a peak intensity of the most frequently appearing pore diameter ($D_{m1/2}/D_m$) of 0.82, a ratio of a pore diameter showing ⅓ of a peak intensity of the most frequently appearing pore diameter ($D_{m1/3}/D_m$) of 0.71, and a maximum intensity of pore diameter 50 Å to the maximum intensity ($D_{V50_{A/D}VM}$) of 0.26. Also, a second peak intensity was about 20%. (Pore size distribution is illustrated in FIG. 2.) A pore volume of less than 1,000 Å was 0.44 cm$^3$/g, and a surface area by BET method was 221 m$^2$/g. This carrier had an average crushing strength of 11 MPa as measured by a minute compression tester.

(Preparation of catalyst/prepolymerization catalyst)

(Preparation of catalyst)

Into a metallic reactor having an inner volume of 13 L and having a stirrer, a mixture of 0.20 kg of the above-mentioned dry silicate and 0.74 L of heptane containing 3% toluene (hereinafter referred to as "mixed heptane") was introduced, and 1.26 L of a heptane solution of tri n-octyl aluminum (0.40 M) was added thereto, and an inner temperature was maintained at 25° C. After reacting for 1 hour, the reaction mixture was fully washed with mixed heptane to prepare 2.0 L of a silicate slurry.

On the other hand, 0.80 L of mixed heptane was added to 2.17 g (3.00 mmol) of (r)-dichloro{1,1'-dimethylsilylenebis[2-methyl-4-(4-chlorophenyl)-4H-azulenyl]}zirconium, and 21.1 mL of a heptane solution of triisobutyl aluminum (0.71 M) was added thereto, and the resultant mixture was reacted at room temperature for 1 hour, and the mixture thus obtained was added to the above prepared silicate slurry, and the resultant mixture was stirred for 1 hour, and mixed heptane was added thereto to adjust the volume to 5.0 L.

Thereafter, an inner temperature was raised to 40° C. and was stabilized, and propylene was supplied thereto at a rate of 67 g/hour, and the temperature was maintained. After 6 hours, the supplying of propylene was stopped, and the mixture was maintained for further 1 hour.

After finishing the prepolymerization, the remaining monomer was purged, and a catalyst obtained was fully washed with mixed heptane. Thereafter, 0.17 L of a heptane solution of triisobutyl aluminum (0.71 M/L) was added thereto, and the product was dried at 45° C. under a reduced pressure. As this result, a prepolymerization catalyst containing 2.12 g of polypropylene per 1 g of catalyst was obtained.

Catalyst particles before prepolymerization and catalyst particles after prepolymerization were subjected to fluorescence observation to take their photographs, and were compared, and an H value was 12%.

(Propylene-Ethylene Random Polymerization)

The same procedure as in Example 1 was repeated, except that the above obtained prepolymerization catalyst was used. As this result, a catalyst activity was 52,100 g/PP/g-catalyst-hour, and a polymer had a bulk density (BD) of 0.475 (g/cc), an MFR value of 8.1 (dg/min) and a melting point of 125.7° C., and a agglomerated polymer amount was 2.5%.

EXAMPLE 3

(Propylene-Ethylene Random Polymerization)

The same procedure as in Example 1 was repeated, except that the prepolymerization catalyst obtained in Example 2 was employed and a polymerization temperature of 65° C. and 35 g of ethylene were employed. As this result, a catalyst activity was 48,500 g/PP/g-catalyst-hour, and a polymer had a bulk density (BD) of 0.483 (g/cc), an MFR value of 1.6 (dg/min) and a melting point of 121.7° C., and a agglomerated polymer amount was 0.9%.

EXAMPLE 4

(Chemical Treatment of Ion-Exchange Layered Silicate)

In a separable flask, 96% sulfuric acid (750 g) was added to 1,130 g of distilled water, and Benclay SL (average particle size 27 um, 300 g) manufactured by Mizusawa Industrial Chemicals, Ltd. as an ion-exchange layered silicate (montmorillonite) was added thereto, and the mixture was reacted at 90° C. for 390 minutes. Thereafter, the reaction product was washed with distilled water to pH 3. A solid obtained was pre-dried at 130° C. for 2 days in a nitrogen stream, and coarse particles of not smaller than 53 μm were removed, and the product was further dried at 200° C. in a nitrogen stream to obtain 140 g of chemically treated smectite. The chemically treated smectite thus obtained had a composition of Al: 4.6 wt %, Si: 41.5 wt %, Mg: 0.60 wt %, Fe: 0.9 wt % and Na<0.2 wt %, and Al/Si=0.115 (mol/mol). This carrier had an average crushing strength of 8 MPa as measured by a minute compression tester.

This carrier had a frequently appearing pore diameter ($D_m$) of 101 Å measured by nitrogen adsorption method, a ratio of pore diameter showing ½ of a peak intensity of the most frequently appearing pore diameter ($D_{m1/2}/D_{gn}$) of 0.83. A pore volume of particles of less than 1,000 Å was 0.43 cm$^3$/g.

(Preparation of Catalyst/Prepolymerization Catalyst)

A three-forked flask having a volume of 1 L was substituted with dry nitrogen, and 20 g of the above-obtained chemically treated smectite was placed therein, and 116 mL of heptane was added thereto to prepare a slurry, and 25 mmol of tri n-octyl aluminum was added thereto, and was stirred for 1 hour, and the resultant product was washed with heptane (washing rate: 1/100), and heptane was added thereto to adjust the total volume to 200 mL.

On the other hand, in another flask (volume 200 mL), (dimethylsilylenebis(2-methyl-4-(p-chlorophenyl)-4H-azulenyl))zirconium dichloride (218 mg, 0.3 mmol) was added to heptane containing 3% of toluene to obtain a slurry, and triisobutyl aluminum (3 mmol: 4.26 mL of a heptane solution having a concentration of 145 mg/mL) was added thereto, and the resultant mixture was stirred at room temperature for 60 minutes to react the mixture.

The solution thus obtained was introduced into a 1 L flask containing a slurry of the above-obtained chemically treated smectite reacted with tri n-octyl aluminum, and the resultant mixture was stirred for 1 hour.

213 mL of heptane containing 3% of toluene was added to the flask containing the above-obtained catalyst slurry before prepolymerization, and the resultant slurry was introduced into a 1 L autoclave.

Into the autoclave, propylene was supplied at a rate of 10 g/hour for 4 hours, and prepolymerization was carried out by maintaining a temperature at 40° C. Thereafter, the supplying of propylene was stopped, and an inner temperature was raised to 50° C. for 5 minutes, and remaining polymerization was carried out for further 2 hours. The catalyst slurry thus obtained was subjected to decantation to remove a supernatant liquid, and triisobutyl aluminum (12 mmol: 17 mL of a heptane solution having a concentration of 140 mg/mL) as a deactivation-preventing agent was added to the remaining portion, and the resultant mixture was stirred for 10 minutes. A solid obtained was dried at 40° C. for 3 hours under a reduced pressure to obtain 68.4 g of a dry prepolymerization catalyst. A prepolymerization magnification (a value obtained by dividing a prepolymerized polymer amount by a solid catalyst amount) was 2.42.

Catalyst particles before prepolymerization and catalyst particles after prepolymerization were subjected to fluorescence observation to take their photographs, and were compared, and an H value was 28%.

(Propylene-Ethylene Random Polymerization)

The same procedure as in Example 1 was repeated, except that the above-obtained prepolymerization catalyst was used. As this result, a catalyst activity was 40,500 g-PP/g-catalyst-hour, and a polymer had a bulk density (BD) of 0.484 (g/cc), an MFR value of 6.1 (dg/min) and a melting point of 125.9° C., and a agglomerated polymer amount was 1.2%.

EXAMPLE 5

(Chemical Treatment of Ion-Exchange Layered Silicate)

In a separable flask, 96% sulfuric acid (2,500 g) was added to 3,750 mL of pure water, and 1,000 g of commercially available monmorillite (Benclay SL manufactured by Mizusawa Industrial Chemicals, Ltd.) was added thereto, and was made into a slurry by stirring at 60° C. The slurry thus obtained was gradually heated to 90° C. for 1 hour, and was reacted at 90° C. for 5 hours, and the reacted slurry was gradually cooled to room temperature for 1.5 hours, and was washed with distilled water until a washing liquid (filtrate) became pH 3. A solid obtained was pre-dried at 130° C. for 2 days in a nitrogen stream, and was further dried at 200° C. for 6 hours under a reduced pressure to obtain 707.2 g of chemically treated montmorillonite.

The chemically treated montmorillonite thus obtained had a composition of Al: 5.21 wt %, Si: 38.9 wt %, Mg: 0.80 wt %, Fe: 1.60 wt % and Na<0.2 wt %, and Al/Si=0.139 (mol/mol).

The product had an average particle size of 24.5 $\mu$m, and an average crushing strength of optionally selected 10 pieces of sphere-like particles was 7.6 MPa. Also, a pore volume was 0.42 cm$^3$/g. The particles thus obtained had a most frequently appearing pore diameter ($D_m$) of 90 A by nitrogen adsorption method and a ratio of a pore diameter showing ½ of a peak intensity of the most frequently appearing pore diameter ($D_{m1/2}/D_m$) of 0.76.

(Preparation of Catalyst/Prepolymerization Catalyst)

In a glass-made reactor having an inner volume of 500 mL, 20.0 g of the above-obtained chemically treated montmorillonite (total pore volume 8.4 cm$^3$) was weighed and placed therein, and 73.7 mL of heptane and 84.0 mL (50.0 mmol) of a heptane solution of triethyl aluminum were added thereto, and the resultant mixture was stirred at room temperature for 1 hour. Thereafter, the resultant product was washed with heptane, and a slurry amount was finally adjusted to 200.0 mL.

On the other hand, 4.26 mL (3003.58 $\mu$mol) of a heptane solution of triisobutyl aluminum was added to 87.2 mL (300.37 $\mu$mol) of a heptane solution of (r)-dimethylsilylenebis{1-[2-methyl-4-(4-chlorophenyl)-4H-azulenyl]}zirconium dichloride at room temperature and the mixture was stirred for 60 minutes.

This complex solution was added to 20.0 g of the above-obtained montmorillonite treated with triethyl aluminum, and the resultant mixture was stirred at room temperature for 60 minutes. Thereafter, the resultant mixed slurry was introduced into a stirring system autoclave of inner volume of 1 L having 209 mL of heptane placed therein, and the resultant mixture was stirred. A temperature in the autoclave was stabilized at 40° C, and propylene was charged therein at a rate of 238.1 mmol/hr (constant rate of 10 g/hr) for 240 minutes. Thereafter, the temperature was raised to 50° C. at a rate of 1° C./min, and was maintained for 2 hours, and the remaining gas was purged to recover a prepolymerization catalyst from the autoclave. The total time taken for the prepolymerization was 6 hours. The recovered catalyst slurry was allowed to stand, and a supernatant liquid was withdrawn. 17.02 mL (12.02 mmol) of a heptane solution of triisobutyl aluminum was added to the solid component remained at room temperature, and the resultant mixture was stirred at room temperature for 10 minutes, and was dried under a reduced pressure to recover 61.8 g of a solid catalyst component. The solid catalyst component thus recovered was analyzed, and a prepolymerized propylene weight was 39.4 g.

Catalyst particles before prepolymerization and catalyst particles after prepolymerization were subjected to fluorescence observation to take their photographs, and were compared, and an H value was 29%.

On the other hand, under the same conditions as in the above prepolymerization treatment, prepolymerization was initiated, and prepolymerization reaction was suspended at various points as shown in Table 6 (by adding ethanol to purge unreacted remaining gas), and a weight amount of polypropylene formed at the respective points was determined to calculate a polymerization rate at the respective points. Also, a part of a polypropylene amount formed at the respective points was calculated from a propylene amount charged upto the respective points and a pressure and a temperature at the respective points without suspending the reaction. An amount of polypropylene formed was determined from a charged propylene amount, from which a propylene amount in the gaseous phase and a propylene amount dissolved in heptane were deducted. The results are shown in Table 6.

Table 6 shows a polypropylene-forming rate of 4 to 7 mg/min per 1 g of chemically treated montmorillonite during from 30 minutes to 1 hour after the initiation of charging propylene and also shows that a low level polypropylene-forming rate of 1 to 3 mg/g·min was maintained after 1 hour. The total pore volume of the montmorillonite used was 8.4 cm$^3$, which corresponds to about 9.3 g of a polypropylene amount. Thus, a time required for forming an amount of a prepolymerized polymer (about 9.3 g of polypropylene) corresponding to the total pore volume of the montmorillonite is about 210 minutes. In Table 1, a polymer-forming rate (mg/g·min) is shown by a maximum value in the initial stage of prepolymerization reaction.

Figure 4:
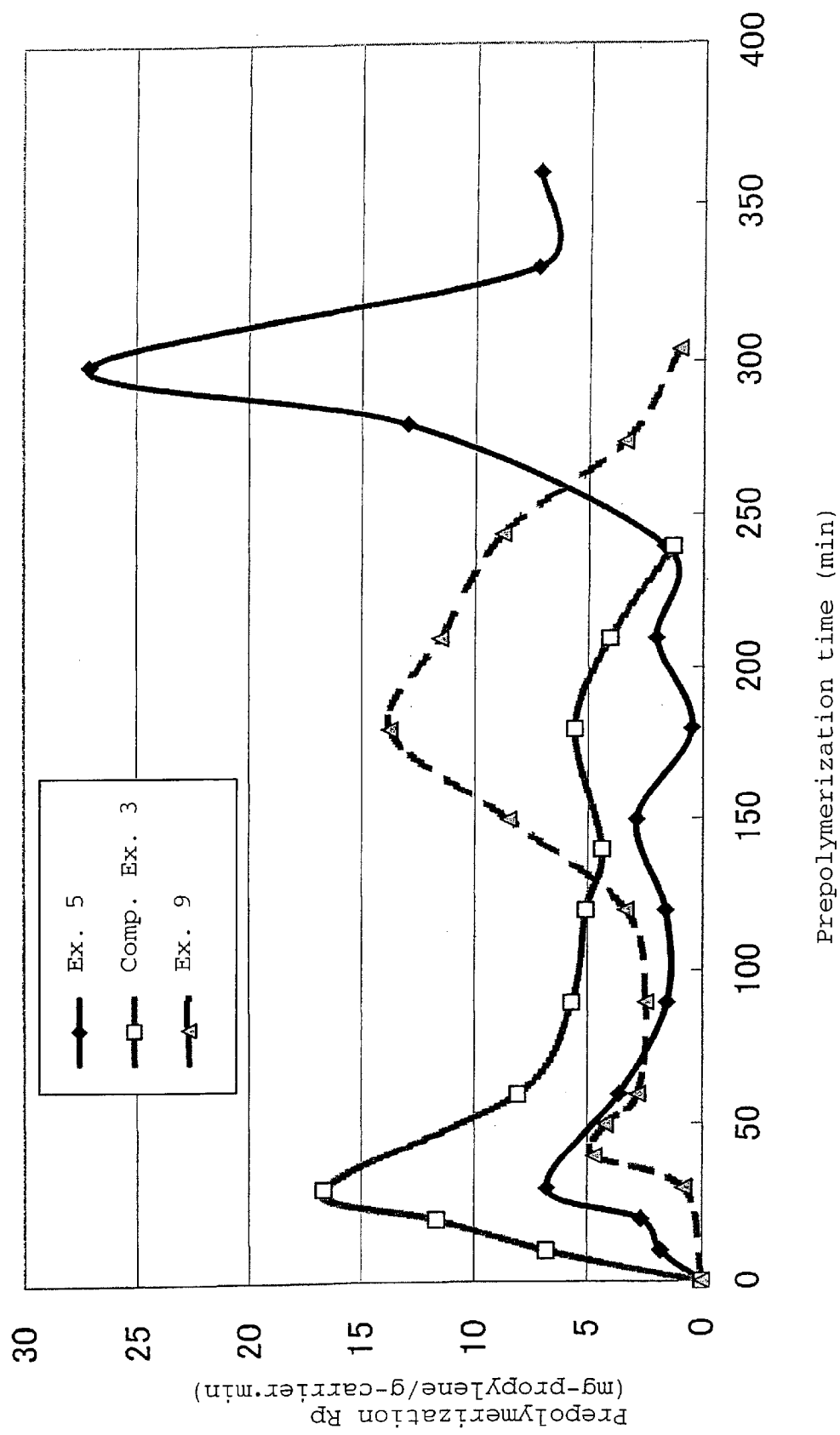
FIG. 4 illustrates prepolymerization activity patterns of Example 5, Example 9 and Comparative Example 3.

A prepolymerization pattern is illustrated in FIG. 4.

(Propylene-Ethylene Random Polymerization)

The same procedure as in Example 1 was repeated, except that the above-obtained catalyst was used. As this result, an amount of a polymer obtained was 170.0 g, and a catalyst activity was 34,000 g-PP/g-catalyst-hour, and a polymer had a bulk density (BD) of 0.441 (g/cc), an MFR value of 10.81 (dg/min), an ethylene content of 3.81 wt % and a melting point of 126.5° C. The results are summarized in Table 1 and Table 2.

EXAMPLE 6

(Propylene-Ethylene Random Polymerization)

The same procedure as in Example 1 was repeated, except that the prepolymerization catalyst prepared in Example 2 was used and 15 g of ethylene and 34 cc of hydrogen were used. As this result, a catalyst activity was 22,000 g-PP/g-catalyst-hour, and a polymer had a bulk density (BD) of 0.483 (g/cc), an MFR value of 6.8 (dg/min), and a melting point of 136.7° C., and a agglomerated polymer was not recognized.

EXAMPLE 7

(Chemical Treatment of Ion-Exchange Layered Silicate)

In a separable flask, 96% sulfuric acid (750 g) was added to 1,130 g of distilled water, and Benclay SL (average particle size 27 μm, 300 g) manufactured by Mizusawa Industrial Chemicals, Ltd. as an ion-exchange layered silicate (montmorillonite) was added thereto, and the resultant mixture was reacted at 90° C. for 390 minutes. Thereafter, the reaction product was washed with distilled water to pH 3. The solid obtained was pre-dried at 130° C. for 2 days in a nitrogen stream, and coarse particles of at least 53 μm were removed, and the product was further dried at 200° C. in a nitrogen stream to obtain 140 g of chemically treated smectite. The chemically treated smectite thus obtained had a composition of Al: 4.6 wt %, Si: 41.5 wt %, Mg: 0.60 wt %, Fe: 0.9 wt % and Na<0.2 wt %, and Al/Si=0.115 (mol/mol). This catalyst had an average crushing strength of 8 MPa as measured by a minute compression tester. This carrier particles had a most frequently appearing pore diameter ($D_m$) of 101 Å by nitrogen adsorption method and a ratio of a pore diameter showing ½ of a peak intensity of the most frequently appearing pore diameter ($D_{m1/2}/D_m$) of 0.83. A pore volume of particles of less than 1,000 Å was 0.43 cm$^3$/g.

(Preparation of Catalyst/Prepolymerization Catalyst)

A three-forked flask having a volume of 1 L was substituted with dry nitrogen, and 20 g of the above-obtained chemically treated smectite was placed therein, and 116 mL of heptane was added thereto to prepare a slurry, and 25 mmol of triethyl aluminum (84 mL of a heptane solution having a concentration of 68 mg/mL) was added thereto, and the resultant mixture was stirred for 1 hour, and the resultant product was washed with heptane (washing rate: 1/100), and heptane was further added to adjust the total volume to 200 mL.

Also, in another flask (volume 200 mL), (dimethylsilylenebis(2-methyl-4-(p-chlorophenyl)-4H-azulenyl))zirconium dichloride (218 mg; 0.3 mmol) was added to heptane containing 3% toluene to prepare a slurry, and triisobutyl aluminum (3 mmol: 4.26 mL of a heptane solution having a concentration of 145 mg/mL) was added thereto, and the resultant mixture was reacted at room temperature for 60 minutes while stirring.

This solution was introduced into a 1 L flask containing the above-obtained slurry of chemically treated smectite reacted with triethyl aluminum, and the resultant mixture was stirred for 1 hour. 213 mL of heptane containing 3% of toluene was added to the flask containing the above slurry, and this slurry was introduced into a 1 L autoclave.

Into the autoclave, propylene was charged at a feeding rate of 10 g/hr at 40° C. for 1 hour, and was then further charged at a feeding rate of 22 g/hr at 50° C. for 3 hours to carry out prepolymerization. A supernatant liquid of a catalyst slurry obtained was removed by decantation, and triisobutyl aluminum (12 mmol: 17 mL of a heptane solution having a concentration of 140 mg/mL) as a deactivation-preventing agent was added to the remaining portion, and the resultant mixture was stirred for 10 minutes. A solid obtained was dried at 40° C. for 3 hours under a reduced pressure to obtain 106 g of a dry prepolymerization catalyst. A prepolymerization magnification (a value obtained by dividing a prepolymerization polymer amount by a solid catalyst amount) was 4.30.

Catalyst particles before prepolymerization and catalyst particles after prepolymerization were subjected to fluorescence observation to take their photographs, and were compared, and an H value was 24%.

(Propylene-Ethylene Random Polymerization)

The same procedure as in Example 1 was repeated, except that the above-obtained prepolymerization catalyst was used, and 15 g of ethylene and 34 cc of hydrogen were used. As this result, a catalyst activity was 11,600 g-PP/g-catalyst-hour, and an MFR value of 5.9 (dg/min), and the obtained powder had a melting point of 136.2° C. and a bulk density of 0.481 g/cc and had satisfactory powder properties.

EXAMPLE 8

(Propylene-Ethylene Random Polymerization)

The same procedure as in Example 1 was repeated, except that the prepolymerization catalyst prepared in Example 4 was used and 15 g of ethylene and 34 cc of hydrogen were used. As this result, a catalyst activity was 12,300 g-PP/g-catalyst-hour, and a polymer had an MFR value of 5.3 (dg/min), a bulk density (BD) of 0.477 (g/cc), and a melting point of 136.0° C., and had satisfactory powder properties.

COMPARATIVE EXAMPLE 1

(Chemical Treatment of Ion-Exchange Layered Silicate)

The same procedure as in Example 1 was repeated, except that 1,590 mL of distilled water, 318 g of magnesium sulfate 7 hydrate, 261 g of concentrated sulfuric acid (96%) and 240 g of montmorillonite were used, and a treating (maintaining) time was 8 hours.

Figure 3:
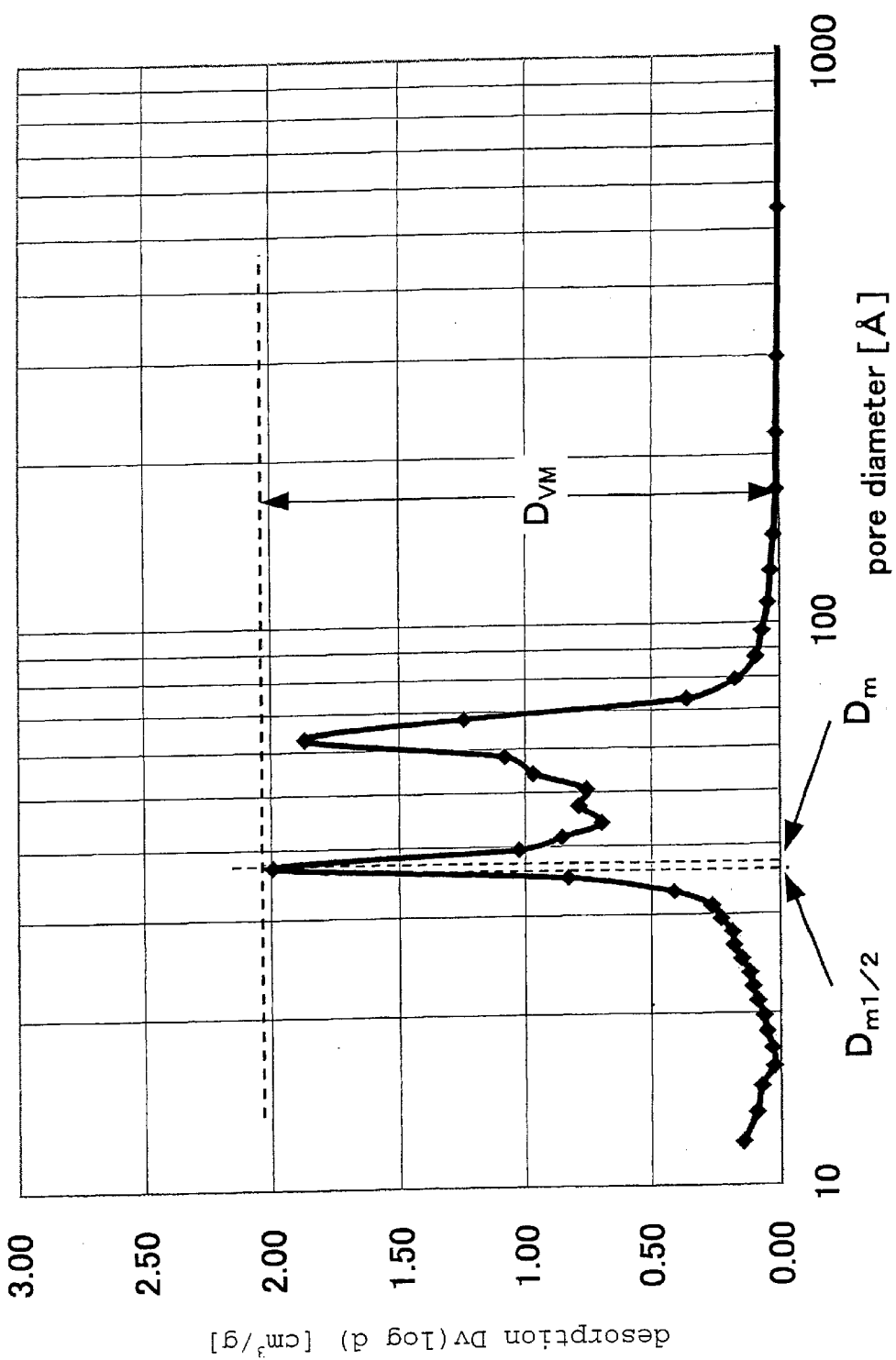
FIG. 3 illustrates a pore size distribution curve of an ion-exchange layered silicate used in Comparative Example 1.

As this result, the obtained polymers had a most frequently appearing pore diameter ($D_m$) of 37 Å by nitrogen adsorption method and a ratio of a pore diameter showing ½ of a peak intensity of the most frequently appearing pore diameter ($D_{m1/2}/D_m$) of 0.97 (pore size distribution is illustrated in FIG. 3). A pore volume of particles of less than 1,000 Å was 0.43 cm$^3$/g and a surface area by BET method was 326 m$^2$/g.

(Preparation of Catalyst/Prepolymerization Catalyst)

The same procedure as in Example 1 was repeated, except that the above chemically treated silicate was employed. As this result, a prepolymerization catalyst containing 1.71 g of polypropylene per 1 g of catalyst was obtained.

Particles before prepolymerization and particles after prepolymerization were subjected to fluorescence observation to take their photographs, and were compared, and an H value was 91%.

(Propylene-Ethylene Random Polymerization)

Polymerization was carried out in the same manner as in Example 1, except that the above-obtained prepolymerization catalyst was used. As this result, a catalyst activity was 25,300 g-PP/g-catalyst-hour, and a polymer had a bulk density (BD) of 0.32 (g/cc), an MFR value of 9.3 (dg/min), and a melting point of 125.9° C., and a agglomerated polymer amount was 85%. The results are shown in the following Tables 1 and 2.

COMPARATIVE EXAMPLE 2

(Chemical Treatment of Ion-Exchange Layered Silicate)

The same procedure as in Comparative Example 1 was repeated, except that the reaction was carried out at 90° C. for 5 hours. The product was dried at 200° C. in a nitrogen stream to obtain 164 g of a chemically treated silicate. The silicate thus obtained had a composition of Al: 6.74 wt %, Si: 37.0 wt %, Mg: 1.49 wt %, Fe: 1.78 wt % and Na<0.2 wt %, and Al/Si=0.190 (mol/mol).

This carrier had an average crushing strength of 17 MPa.

(Preparation of Catalyst/Prepolymerization Catalyst)

A catalyst slurry before prepolymerization was prepared in the same manner as in Example 7, except that 20 g of the above-prepared chemically treated smectite and 10 mmol of triethyl aluminum were employed.

Also, a solution prepared by reacting triisobutyl aluminum (3 mmol: 4.26 mL of a heptane solution having a concentration of 140 mg/mL) with a toluene 87 mL solution of dimethylsilylenebis(2-methyl-4-(4-chlorophenyl)-4H-azulenyl)zirconium dichloride (0.3 mmol) was added to the above-prepared slurry.

The above-prepared catalyst slurry before prepolymerization was introduced into a 1 L autoclave, and 210 mL of heptane was added thereto, and propylene was supplied at 40° C. for 2 hours at a feeding rate of 20 g/hr to carry out prepolymerization. Thereafter, the supplying of propylene was stopped, and remaining polymerization was carried out at 40° C. for further 2 hours. After removing a supernatant liquid of the above obtained catalyst slurry, triisobutyl aluminum (12 mmol: 17 mL of a heptane solution having a concentration of 140 mg/mL) as a deactivation-preventing agent was added thereto, and the mixture was stirred for 10 minutes. A solid obtained was dried for 3 hours under a reduced pressure to obtain 31.4 g of a dry prepolymerization catalyst. A prepolymerization magnification (a value obtained by dividing a prepolymerization polymer amount by a solid catalyst amount) was 0.57.

The above catalyst particles before prepolymerization and catalyst particles after prepolymerization were subjected to fluorescence observation to take their photographs, and were compared, and an H value was 94%.

(Propylene-Ethylene Random Polymerization)

Polymerization of propylene was carried out in the same manner as in Example 6, except that the above catalyst after prepolymerization was employed. The powder product thus obtained had a melting point of 134.9° C., and a bulk density of 0.376 g/cc, and its powder properties were unsatisfactory.

COMPARATIVE EXAMPLE 3

Chemical Treatment of Ion-Exchange Layered Silicate)

100 g of commercially available montmorillonite (Kunipia F, manufactured by Kunimine Industries Co., Ltd.) pulverized by a jet mill was dispersed in 385 mL of pure water having 133 g of magnesium sulfate 7 hydrate and 109 g of sulfuric acid dissolved, and the resultant mixture was reacted at 100° C. for 2 hours, and was cooled to room temperature. This slurry was filtrated under a reduced pressure by an apparatus equipped with a Nutsche panel having a diameter of 18 cm and an aspirator connected with a suction bottle. The filtration was finished after 1 hour. A cake was recovered and was made into a slurry again with 3,000 mL of pure water, and washing was repeated 3 times. The filtration time was increased in proportion to times of washing, and the final filtration took about 3 hours. The final washing liquid (filtrate) had a pH value of 3.47.

(Granulation of Ion-Exchange Layered Silicate)

The above chemically treated and washed cake solid was made into a slurry having a concentration of 12 wt % by adding pure water thereto, and the slurry thus prepared was stirred for 1 hour and was subjected to homogenizer treatment for 10 minutes. A part of the slurry was recovered to measure a particle size, and the particle size was 5.1 μm. A fraction of particles of less than 1 μm was less than 0.1%.

The chemically treated montmorillonite slurry was spray-granulated by a spray-granulating apparatus (L-8) manufactured by Okawara Kakouki K. K. Slurry properties and operation conditions are illustrated below. (Slurry properties: pH=2.84, slurry viscosity=30 CP and density=1.081 g/cc; operation conditions: atomizer rotation number=15,000 rpm, supplied liquid amount=0.7 L/hr, inlet temperature=196° C., outlet temperature=130° C. and cyclone pressure difference=60 mmH$_2$O)

As this result, 60 g of granules were recovered. The granules thus obtained had a bulk density (BD) of 0.46 g/cc and an average particle size of 47.0 μm, and an average crushing strength measured by optionally selecting 10 pieces of sphere-like particles was 1.2 MPa. Also, a pore volume was 0.48 cm$^3$/g.

(Preparation of Catalyst)

A catalyst was prepared in the same manner as in Example 5, except that 20.0 g of the above-obtained granulated silicate (total pore volume=9.6 cm$^3$) was used and propylene was supplied at a feeding rate of 476.2 mmol/hr (constant rate of 20 g/hr) for 120 minutes. As this result, 54.68 g of a solid catalyst component was recovered. The solid catalyst component thus obtained was analyzed, and a prepolymerized polypropylene weight amount was 32.3 g.

Catalyst particles before prepolymerization and catalyst particles after prepolymerization were subjected to fluorescence observation to take their photographs, and were compared, and an H value was 28%.

On the other hand, prepolymerization was initiated under the same conditions as in the above prepolymerization treatment, and prepolymerization reaction was suspended (ethanol was added to purge an unreacted remaining gas) at respective points as shown in Table 6, and polypropylene amounts formed until the respective points were measured, and polymerization rates at the respective points were calculated. The results are shown in the following Table 6.

It was proved from Table 6 that a polypropylene-forming rate was 10 to 17 mg/min per 1 g of silicate during 20 to 30 minutes after the initiation of feeding propylene, and thereafter the forming rate was maintained at a high level of from 6 to 11 mg/min.

The used silicate had a total pore volume of 9.6 cm$^3$ corresponding to 10.7 g of a polypropylene weight amount. Accordingly, a time required for forming a prepolymerized polymer (10.7 g of polypropylene) corresponding the total pore volume of the silicate was about 50 minutes.

The prepolymerization pattern is illustrated in FIG. 4.

(Propylene-Ethylene Random Copolymerization)

The same procedure as in Example 1 was repeated, except that the above prepolymerization catalyst was used. As this result, the propylene-ethylene copolymer thus obtained was 55.0 g. A catalyst activity was 11,000 g-pp/g-catalyst-hour, and a copolymer had a polymer bulk density (BD) of 0.365 (g/cc), an MFR value of 3.41 (dg/min), an ethylene content of 3.86 wt % and a melting point of 125.9° C. The results are summarized in the following Table 1 and Table 2.

COMPARATIVE EXAMPLE 4

(Preparation of Catalyst)

A catalyst was prepared in the same manner as in Comparative Example 2, except that a prepolymerization temperature was 60° C. As this result, a catalyst having a prepolymerization magnification (a value obtained by dividing a prepolymerized polymer amount by a solid catalyst amount) of 2.07 was obtained.

Catalyst particles before prepolymerization and catalyst particles after prepolymerization were subjected to fluorescence observation to take their photographs, and were compared, and an H value was 89%.

(Propylene-Ethylene Random Copolymerization)

The same procedure as in Example 1 was repeated, except that the above prepolymerization catalyst was used. As this result, a catalyst activity was 36,000 g-pp/g-catalyst-hour, and the polymer thus obtained had a polymer bulk density (BD) of 0.33 (g/cc), an MFR value of 8.2 (dg/min), and a melting point of 127.0° C.

EXAMPLE 9

(Preparation of Catalyst/Prepolymerization Catalyst)

The same procedure as in example 2 was repeated, except that propylene was supplied at a rate of 100 g/hr for 4 hours at the time of prepolymerization. As this result, a prepolymerization catalyst containing 2.25 g of polypropylene per 1 g of a catalyst was obtained.

Catalyst particles before prepolymerization and catalyst particles after prepolymerization were subjected to fluorescence observation to take their photographs, and were compared, and an H value was 15%.

It was proved from Table 6 that a polypropylene-forming rate per 1 g of chemically treated montmorillonite was from 1 to 5 mg/min during 30 minutes to 1 hour after the initiation of feeding propylene, and thereafter the forming rate was maintained at a low level of from 2 to 3 mg/min after 1 hour. Accordingly, a time required for forming a prepolymerized polymer in an amount of corresponding to the total pore volume of the montmorillonite was about 120 minutes. Also, Table 1 shows that a polymer-forming rate (mg/g·min) indicated a maximum value in the initial stage of prepolymerization reaction. The prepolymerization pattern is illustrated in FIG. 4.

(Propylene-Ethylene Random Polymerization)

A propylene-ethylene copolymer was continuously produced in accordance with a process provided with a bulk polymerization tank system comprising a liquid phase polymerization tank of an internal volume of 400 L equipped with a stirrer, a slurry-circulating pump and a circulating line, a degassing system comprising a double tube system heat exchanger and a flow flash tank, and a screw feeder type drier having an inner diameter of 115 mm and a length of 2.0 m and equipped with a paddle vane having a diameter of 110 mm and also equipped with a jacket in the outside.

The above prepared prepolymerization catalyst was dispersed in liquid paraffin (Whitelex 335 manufactured by Tonen K. K.) so as to make a concentration of 20 wt %, and a catalyst was introduced in an amount of 0.42 g/hr as a catalyst component. Into this reactor, 78 kg/hr of liquid propylene, 2.4 kg/hr of ethylene, 0.46 g/hr of hydrogen and 56.8 g/hr of triisobutyl aluminum were continuously supplied, and polymerization was carried out by maintaining an internal temperature at 65° C. As this result, a propylene-ethylene random copolymer having quite satisfactory powder properties was obtained in an amount of 22.0 kg/hr. A catalyst activity was 52,400 g-pp/g-catalyst, and an activity per 1 hour was 40,300 g-pp/g-catalyst-hour.

The polymer powder thus obtained and the inside of the reactor were checked, but agglomeration of the polymer powders and deposition or adhesion of the polymer powders onto the reactor were not observed at all. The polymer powder thus obtained had MFR=7.9, Tm=125.1° C. and polymer BD=0.484 g/cc. The results are summarized in the following Table 3.

EXAMPLE 10

(Propylene-Ethylene Random Copolymerization)

Polymerization was carried out in the same manner as in Example 9, except that 0.84 g/hr of the prepolymerization catalyst as a catalyst component, 1.30 kg/hr of ethylene, 0.30 g/hr of hydrogen and 58.0 g/hr of triisobutyl aluminum were supplied and a polymerization temperature of 70° C. was used, and a propylene-ethylene random copolymer having excellent powder properties was obtained in an amount of 23.2 kg/hr. A catalyst activity was 27,600 g-pp/g-catalyst, and an activity per 1 hour was 21,200 g-pp/g-catalyst-hour.

The polymer powder thus obtained and the inside of the reactor were checked, but agglomeration of the polymer powders and deposition or adhesion of the polymer powders onto the reactor were not observed at all. The polymer powder thus obtained had MFR=7.4, Tm=133.9° C. and polymer BD=0.489 g/cc. The results are summarized in the following Table 3.

EXAMPLE 11

(1) Chemical Treatment of Clay Mineral

In a 2 L flask, 200 g of commercially available swellable montmorillonite ("Benclay SL", manufactured by Mizusawa Industrial Chemicals, Ltd.) was dispersed in a mixture solution of 1,019 g of desalted water, 124 g of 98% sulfuric acid and 96 g of titanium sulfate, and the resultant mixture was stirred at 90° C. for 10 hours. The resultant product was filtrated and washed with desalted water to pH 3.5.

(2) Drying of Clay Mineral

A water-containing solid cake obtained in the above paragraph (1) was pre-dried at 110° C. for 10 hours to obtain titanium salt-treated montmorillonite. Among the pre-dried montmorillonite, particles passed through a 150 mesh were further dried under a reduced pressure at 200° C. for 2 hours. This carrier had an average crushing strength of 14 MPa as measured by a minute compression tester.

(3) Organic Aluminum Compound Treatment of Salt-Treated Montmorillonite 100 g of the dry montmorillonite particles obtained in the above paragraph (2) was placed in a 3 L flask under a nitrogen atmosphere, and was dispersed in 118 mL of n-heptane. Further, 483 mL of a n-heptane solution of triethyl aluminum (concentration 0.622 mol/L) was added thereto at room temperature with stirring, and the mixture was reacted for 1 hour, and the resultant product was subjected to settling separation to remove 400 mL of a supernatant liquid. Thereafter, 400 mL of n-heptane was added thereto, and the mixture was stirred for 10 minutes, and the resultant product was subjected to settling separation and was subjected to washing steps three times to remove 400 mL of a supernatant liquid.

(4) Catalyst Preparation 1.3 L of n-heptane and 12.0 mmol (5.90 g) of bis(n-butylcyclopentadienyl)hafnium dichloride were dispersed in 2.0 L of n-heptane in a 10 L reactor equipped with a dielectric stirrer under a nitrogen atmosphere, and the mixture was stirred at 75° C. for 10 minutes. Further, 96.0 mmol (10.96 g) of triethyl aluminum was added thereto, and the resultant mixture was further stirred for 10 minutes. Thereafter, while maintaining the temperature, a slurry dispersion of 0.90 L of n-heptane and 100 g of the organic aluminum compound-treated montmorillonite obtained in the above paragraph (3) was introduced into the reactor, and the resultant mixture was stirred for 10 minutes.

(5) Prepolymerization and Drying

The temperature of the reaction system of the above paragraph (4) was adjusted to 80° C., and an ethylene gas was introduced at a rate of 10.0 NL/min for 75 minutes to carry out prepolymerization. The supplying of ethylene was stopped, and the ethylene gas in the reactor was substituted with nitrogen. The above-obtained prepolymerization catalyst slurry was washed with n-heptane until the product of a washing rate becomes 1/8.6. The above-obtained prepolymerization catalyst slurry was placed in a 15 L tank type vibrating system vacuum drier equipped with a steam jacket for conducting heat, and 4 L of heptane was then added into the reactor, and all of the contents remaining in the reactor were transferred to the drier. After allowing to stand to remove about 5 L of supernatant liquid, 56 mmol (11.11 g) of triisobutyl aluminum was added thereto at room temperature, and 11.2 mmol (5.50 g) of a solid powder of bis(n-butylcyclopentadienyl)hafnium dichloride was then added thereto, and was dissolved by shaking at 40° C. for 10 minutes. After continuing the shaking for 10 minutes, the resultant mixture was subjected to drying under a reduced pressure at 70° C. to distill the solvent off. While maintaining the temperature, after visually recognizing that the solvent was substantially distilled off, drying under a reduced pressure was carried out for 2 hours, and as this result, 1,016 g of a prepolymerization catalyst powder was recovered.

(6) Prepolymerization and Drying 900 g of a prepolymerization catalyst powder obtained in the paragraph (5) was introduced into the reactor of the above paragraph (4) under a nitrogen atmosphere, and was made into a slurry again with 4.2 L of n-heptane. After adjusting an inner temperature to 75° C., 96.0 mmol (10.96 g) of triethyl aluminum was added thereto and the resultant mixture was stirred for 10 minutes. After adjusting the temperature in the system to 80° C., an ethylene gas was introduced at a rate of 10.0 NL/min for 75 minutes to carry out prepolymerization. The supplying of ethylene was stopped, and the ethylene gas in the reactor was substituted with nitrogen. The prepolymerization catalyst slurry thus obtained was placed in the drier used in the above paragraph (5), and 4 L of heptane was then added to the reactor to transfer all of the contents remaining in the reactor into the drier. After allowing to stand to remove about 5 L of a supernatant liquid, drying under a reduced pressure was carried out at 70° C. to distill a solvent off. While maintaining the temperature, after visually recognizing that the solvent was substantially distilled off, drying under a reduced pressure was carried out for 2 hours, and as this result, 1,851 g of a prepolymerization catalyst powder was recovered.

(7) Observation of Catalyst by Fluorescence Microscope

The catalyst particles before prepolymerization of the above paragraph (4) and the catalyst particles after prepolymerization of the above paragraph (6) were subjected to fluorescence observation to take their photographs, and were compared, and among the catalyst after prepolymerization, a proportion of a number of particles having a fluorescence density not lower than the fluorescence density of the particles before prepolymerization (H value) was 3%.

(8) Ethylene-1-Butene Copolymerization

Gas phase copolymerization of ethylene-1-butene was carried out by using the prepolymerization catalyst of the above paragraph (6). Thus, 517 mg/hr of the prepolymerization catalyst powder obtained in the above paragraph (6), 100 mg/hr of triisobutyl aluminum and 68 mg/hr of diethyl aluminum ethoxide were intermittently supplied into a continuous type gas phase polymerization reactor in which a mixture gas of ethylene, butene and hydrogen (butene/ethylene=1.8%, hydrogen/ethylene=0.038%) is circulated. Polymerization reaction conditions were 90° C., an ethylene partial pressure of 18 kg/cm$^2$, an average production amount of polymer of 292 g/hr, and an average retention time of 4.1 hours.

(9) Blending of Additives

The following antioxidant and neutralizing agent were blended with the above obtained ethylene-α-olefin copolymer as additives, and the blended product was kneaded and granulated by a monoaxial extruder having an aperture diameter of 20 mm.

Anti-oxidant: 1,000 ppm of octadecyl-3-(3,5-t-butyl-4-hydroxyphenyl)propionate (Irganox 1076 manufactured by Chiba Speciality Chemicals Company); 700 ppm of tetrakis-(2,4-di-butylphenyl)4,4-biphenylene-diphosphite (PEPQ manufactured by Clariant K. K.)

Neutralizing agent: 300 ppm of calcium stearate (Ca-St (B.K) manufactured by Nitto Kasei Co., Ltd.)

(10) Film Formation and Evaluation

Blown-film molding was carried out under the following operation conditions by using a monoaxial extruder having an aperture diameter of 30 mm.

Screw: aperture diameter 30 mm, L/D=25, full flight type

Screw rotation number: about 270 rpm

Dye: spiral mandrel die, aperture diameter 25 mm, lip width 2.0 mm

Resin temperature: 180° C.

Film size: folding diameter 78 mm, thickness 20 μm

The film thus obtained was visually observed, and a number of fish eyes having a size of a long diameter of at least 0.1 mm was calculated per 1 g of film was measured to be 7.8 pieces/g. The results are summarized in the following Table 4 and Table 5.

COMPARATIVE EXAMPLE 5

Catalyst observation by a fluorescence microscope, ethylene-1-butene copolymerization, blending of additives, and film formation and evaluation were carried out in the same manner as in Example 11 (7), (8), (9) and (10) by using the prepolymerization catalyst powder obtained in Example 11 (5). The results are summarized in the following Table 4 and Table 5.

EXAMPLE 12

(1) Acid Treatment of Clay Mineral 200 g of commercially available swellable montmorillonite ("Benclay SL", manufactured by Mizusawa Industrial Chemicals, Ltd.) was dispersed in 800 g of 25% sulfuric acid, and the resultant mixture was stirred at 90° C. for 2 hours. The resultant product was filtrated and washed with desalted water.

(2) Salt Treatment and Drying of Clay Mineral

All the sulfuric acid-treated montmorillonite cake obtained in the above paragraph (1) was dispersed in 1,276 g of a commercially available titanyl sulfate aqueous solution (containing 7.5% of TiO$_2$ and 25.6% of SO$_4$, manufactured by Sakai Chemical Industry Co., Ltd.), and the resultant dispersion was stirred at 30° C. for 3 hours. The resultant product was filtrated and washed with desalted water to pH 3.5, and a water-containing solid cake obtained was pre-dried at 110° C. for 10 hours to obtain titanium salt-treated montmorillonite. Among the pre-dried montmorillonite, particles passed through a 150 mesh sieve were further dried under a reduced pressure at 200° C. for 2 hours. This carrier had an average crushing strength of 18 MPa as measured by a minute compression tester.

(3) Preparation of Catalyst 2.41 L of n-heptane and a slurry dispersion of 0.90 L of n-heptane and 100 g of the dry montmorillonite obtained in the above paragraph (2) were introduced into a 10 L reactor equipped with a dielectric stirrer under a nitrogen atmosphere. A temperature in the system was adjusted to 30° C., 24.0 mmol (11.8 g) of bis(n-butylcyclopentadienyl)hafnium dichloride was dispersed in 0.9 L of n-heptane, and 96.0 mmol (10.96 g) of triethyl aluminum was immediately added thereto, and the temperature in the system was raised to 40° C. The resultant mixture was further stirred for 60 minutes, and was cooled to 30° C. and was washed with n-heptane until a washing rate of 1/69.

(4) Prepolymerization

N-heptane was added to the catalyst slurry obtained in the above paragraph (3) to make a liquid amount of 4.21 L, and 96.0 mmol (10.96 g) of triethyl aluminum was added thereto at 30° C., and the temperature was immediately raised to 75° C., and the mixture was stirred for further 10 minutes. Thereafter, the temperature in the system was adjusted to 80° C., and an ethylene gas was introduced at a rate of 10.0 NL/min for 80 minutes to carry out prepolymerization. The supplying of ethylene was stopped, and the ethylene gas in the reactor was substituted with nitrogen.

(5) Drying of Prepolymerization Catalyst

All the prepolymerization catalyst slurry obtained in the above paragraph (4) was transferred into a dryer used in Example 11 (5) under a nitrogen atmosphere. 4 L of heptane was added to the reactor, and all the contents remaining in the reactor were transferred into a drier. The prepolymerization catalyst slurry transferred into the reactor was allowed to stand to remove about 5 L of a supernatant liquid, and drying under a reduced pressure was carried out at 70° C. to distil a solvent off. While maintaining the temperature, it was visually recognized that the solvent was substantially distilled off, and drying under a reduced pressure was then carried out for 2 hours, and as this result, 982 g of a prepolymerization catalyst powder was recovered.

(6) Ethylene-1-Hexene Copolymerization

Gas phase copolymerization of ethylene and 1-hexene was carried out by using the prepolymerization catalyst of the above paragraph (5). Thus, 366 mg/hr of the prepolymerization catalyst powder obtained in the above paragraph (6), 100 mg/hr of triisobutyl aluminum and 68 mg/hr of diethyl aluminum ethoxide were intermittently supplied into a continuous type gas phase polymerization reactor in which a mixture gas of ethylene, hexene and hydrogen (hexene/ethylene=1.2%, hydrogen/ethylene=0.036%) is circulated. Polymerization reaction conditions were 90° C., an ethylene partial pressure of 18 kg/cm, an average production amount of polymer of 265 g/hr, and an average retention time of 4.5 hours (7) Evaluation Observation of a catalyst by a fluorescence microscope, blending of additives, film formation and evaluation were carried out in the same manner as in Example 11 (7), (9) and (10). The results are summarized in the following Table 4 and Table 5.

COMPARATIVE EXAMPLE 6

(1) Preparation of Catalyst 2.41 L of n-heptane and a slurry dispersion of 0.90 L of n-heptane and 100 g of the dry montmorillonite obtained in Example 12 (2) were introduced into a 10 L reactor equipped with a dielectric stirrer under a nitrogen atmosphere. The temperature in the system was adjusted to 30° C., and 24.0 mmol (11.8 g) of bis(n-butylcyclopentadienyl)hafnium dichloride was dispersed in 0.9 Q of n-heptane, and 96.0 mmol (10.96 g) of triethyl aluminum was immediately added thereto, and the temperature in the system was raised to 75° C., and the resultant mixture was stirred for further 10 minutes.

(2) Prepolymerization

The temperature in the system of the above paragraph (1) was adjusted to 80° C., an ethylene gas was introduced at a rate of 10.0 NL/min for 80 minutes to carry out prepolymerization. The supplying of ethylene was stopped, and the ethylene gas in the reactor was substituted with nitrogen. The temperature in the system was cooled to 30° C., and the resultant product was washed with n-heptane until a washing rate of 1/69. Drying of the prepolymerization catalyst was carried out in the same manner as in Example 12 (5) to recover 783 g of a prepolymerization catalyst powder.

(3) Evaluation

Ethylene-1-hexene copolymerization, observation of a catalyst by a fluorescence microscope, blending of additives, film formation and evaluation were carried out in the same manner as in Example 12 (6) and Example 11 (7), (9) and (10). The results are summarized in the following Table 4 and Table 5.

TABLE 1

|  | Maximum peak pore diameter $D_m$ (Å) | 1/2 Intensity pore diameter $D_{m1/2}$ (Å) | Pore diameter ratio $D_{m1/2}/D_m$ | Pore volume (cm³/g) | Average crushing strength (MPa) | Acid concentration N | Polymer-forming rate (mg/g · min) | Prepolymerization homogenization index H value | Polymer-forming rate (mg/g · min) |
|---|---|---|---|---|---|---|---|---|---|
| Ex. 1 | 101 | 77 | 0.76 | 0.42 | 13 | 10.6 | 7 | 25 | 7 |
| Ex. 2 | 101 | 83 | 0.82 | 0.44 | 11 | 10.6 | 5 | 12 | 5 |
| Ex. 3 | 101 | 83 | 0.82 | 0.44 | 11 | 10.6 | 5 | 12 | 5 |
| Ex. 4 | 101 | 84 | 0.83 | 0.43 | 8 | 10.6 | 7 | 28 | 7 |
| Ex. 5 | 90 | 68 | 0.76 | 0.42 | 7.6 | 10.6 | 7 | 29 | 7 |
| Ex. 6 | 101 | 83 | 0.82 | 0.44 | 11 | 10.6 | 5 | 12 | 5 |
| Ex. 7 | 101 | 84 | 0.83 | 0.43 | 8 | 10.6 | 7 | 24 | 7 |

TABLE 1-continued

| | Maximum peak pore diameter $D_m$ (Å) | 1/2 Intensity pore diameter $D_{m1/2}$ (Å) | Pore diameter ratio $D_{m1/2}/D_m$ | Pore volume (cm³/g) | Average crushing strength (MPa) | Acid concentration N | Polymer-forming rate (mg/g · min) | Prepolymerization homogenization index H value | Polymer-forming rate (mg/g · min) |
|---|---|---|---|---|---|---|---|---|---|
| Ex. 8 | 101 | 84 | 0.83 | 0.43 | 8 | 10.6 | 7 | 28 | 7 |
| Comp. Ex. 1 | 37 | 36 | 0.97 | 0.43 | 17 | 3.1 | 7 | 91 | 7 |
| Comp. Ex. 2 | 39 | 37 | 0.95 | 0.38 | 17 | 3.1 | 17 | 94 | 17 |
| Comp. Ex. 3 | 39 | 33 | 0.85 | 0.48 | 1.2 | 3.1 | 17 | 45 | 17 |
| Comp. Ex. 4 | 39 | 37 | 0.95 | 0.38 | 17 | 3.1 | 17 | 89 | 17 |
| Ex. 9 | 101 | 83 | 0.82 | 0.44 | 11 | 10.6 | 5 | 15 | 5 |
| Ex. 10 | 101 | 83 | 0.82 | 0.44 | 11 | 10.6 | 5 | 15 | 5 |

TABLE 2

| | Prepolymerization homogenization index H value | Catalyst activity g-PP/g-cat.hr | MFR dg/min | Tm °C. | BD g/cc | Agglomerated amount wt % |
|---|---|---|---|---|---|---|
| Ex. 1 | 25 | 35600 | 8.5 | 126.8 | 0.450 | 0.8 |
| Ex. 2 | 12 | 52100 | 8.1 | 125.7 | 0.475 | 2.5 |
| Ex. 3 | 12 | 48500 | 1.6 | 121.7 | 0.483 | 0.9 |
| Ex. 4 | 28 | 40500 | 6.1 | 125.9 | 0.484 | 1.2 |
| Ex. 5 | 29 | 34000 | 10.8 | 126.5 | 0.441 | 1.5 |
| Ex. 6 | 12 | 22000 | 6.8 | 136.7 | 0.483 | <0.5 |
| Ex. 7 | 24 | 11600 | 5.9 | 136.2 | 0.481 | <0.5 |
| Ex. 8 | 28 | 12300 | 5.3 | 136.0 | 0.477 | <0.5 |
| Comp. Ex. 1 | 89 | 25300 | 9.3 | 125.9 | 0.320 | 85 |
| Comp. Ex. 2 | 94 | 12500 | 4.8 | 134.9 | 0.376 | <0.5 |
| Comp. Ex. 3 | 45 | 11000 | 3.4 | 125.9 | 0.365 | 5.7 |
| Comp. Ex. 4 | 89 | 36000 | 8.2 | 127.0 | 0.330 | 83 |

TABLE 3

| | Catalyst amount g/hr | Production amount kg/hr | Catalyst activity g-PP/g-cat.hr | Activity g-PP/g-cat | MFR dg/min | Tm °C. | BD g/cc |
|---|---|---|---|---|---|---|---|
| Ex. 9 | 0.42 | 22.0 | 52400 | 40300 | 7.9 | 125.1 | 0.484 |
| Ex. 10 | 0.84 | 23.2 | 27600 | 21200 | 7.4 | 133.9 | 0.489 |

TABLE 4

| | Maximum peak pore diameter $D_m$ (Å) | 1/2 Intensity pore diameter $D_{m1/2}$ (Å) | Pore diameter ratio $D_{m1/2}/D_m$ | Pore volume (g/cm³) | Average crushing strength (MPa) |
|---|---|---|---|---|---|
| Ex. 11 | 72 | 55 | 0.76 | 0.34 | 14 |
| Ex. 12 | 75 | 58 | 0.77 | 0.35 | 18 |
| Comp. Ex. 5 | 72 | 55 | 0.76 | 0.34 | 14 |
| Comp. Ex. 6 | 75 | 58 | 0.77 | 0.35 | 18 |

TABLE 5

| | Catalyst H value (%) | Catalyst BD (g/cm³) | polymerization result Activity (g-PE/g-[B]) | Physical properties of product MFR (g/10 min) | Physical properties of product Density (g/cm³) | Physical properties of product BD (g/cm³) | Physical properties of product FE (pieces/g) |
|---|---|---|---|---|---|---|---|
| Ex. 11 | 3 | 0.390 | 11800 | 1.4 | 0.925 | 0.456 | 7.8 |
| Ex. 12 | 17 | 0.411 | 7100 | 1.3 | 0.934 | 0.477 | 15.0 |
| Comp. Ex. 5 | 61 | 0.339 | 12400 | 1.2 | 0.923 | 0.439 | 18.0 |
| Comp. Ex. 6 | 67 | 0.355 | 9950 | 1.3 | 0.934 | 0.446 | 62.4 |

TABLE 6

| Polymerization time Min. | Example 5 Polymerized amount g | Example 5 Polymerization rate mg/g · min | Comparative Example 3 Polymerized amount g | Comparative Example 3 Polymerization rate mg/g · min | Example 9 Polymerized amount g | Example 9 Polymerization rate mg/g · min |
|---|---|---|---|---|---|---|
| 0 | 0.00 | 0.0 | 0.00 | 0.0 | 0.00 | 0.0 |
| 5 | | | | | | |
| 10 | 0.00 | 1.8 | 1.66 | 6.8 | 0.00 | 0.0 |
| 15 | | | | | | |
| 20 | 0.17 | 2.6 | 2.60 | 11.7 | | |
| 25 | | | | | | |
| 30 | 1.67 | 7.0 | 3.33 | 16.7 | 0.50 | 0.8 |
| 40 | | | | | 0.96 | 4.7 |
| 50 | | | | | 0.86 | 4.2 |
| 60 | 2.16 | 3.6 | 5.97 | 8.1 | 0.57 | 2.8 |
| 70 | | | | | | |
| 74 | | | | | | |
| 80 | | | | | | |
| 90 | 0.92 | 1.5 | 4.37 | 5.7 | 1.50 | 2.4 |
| 120 | 0.96 | 1.6 | 6.86 | 10.9 | 2.05 | 3.3 |
| 150 | 1.72 | 2.9 | 1.02 | 4.4 | 5.23 | 8.5 |
| 155 | | | 1.00 | 4.3 | | |
| 180 | 0.29 | 0.5 | 3.75 | 5.6 | 8.45 | 13.8 |
| 210 | 1.22 | 0.2 | 2.56 | 4.0 | 7.08 | 11.5 |
| 240 | 1.00 | 1.7 | 0.81 | 1.3 | | |
| 244 | | | | | 6.12 | 8.8 |
| 270 | | | | | | |
| 274 | | | | | 1.40 | 3.4 |
| 280 | 13.21 | 13.0 | | | | |
| 300 | 10.85 | 27.1 | | | | |
| 304 | | | | | 0.67 | 1.1 |
| 330 | 4.36 | 7.3 | | | | |
| 360 | 4.31 | 7.2 | | | | |

INDUSTRIAL APPLICABILITY (EFFECT OF THE INVENTION)

According to the present invention, a polymer having excellent particle properties can be obtained at a high activity and at a low cost. Particularly, in the production of a low melting point polymer which has been considered to be difficult because of causing fouling, agglomeration of polymer particles and adhesion or deposition of a polymer to a reactor can be prevented in the present invention. Also, since a bulk density of a polymer is improved, a continuous stable operation can be easily made on an industrial scale, and productivity can be improved.

Also, the present invention solves such problems that fine powders are produced since catalyst particles and polymer particles easily collapse in case of particles having a too low carrier strength, and also solves such problems that fine powders are produced since growth of particles is non-uniform in prepolymerization in case of particles having a too high carrier strength and that unpulverized carrier nuclei remained in catalyst particles produce fish eyes and gels which make an outer appearance of a product poor.

Further, by using a catalyst component or a catalyst of the present invention, it is possible to produce a low melting point polymer efficiently and stably even at a higher polymerization temperature than in conventional cases.

The entire disclosures of Japanese Patent Application No. 2000-277640 filed on Sep. 13, 2000, Japanese Patent Application No. 2001-075412 filed on Mar. 16, 2001 and Japanese Patent Application No. 2001-109549 filed on Apr. 9, 2001 including specifications, claims, drawings and summaries are incorporated herein by reference in its entirety.

What is claimed is:

1. A catalyst component for olefin polymerization, which comprises an ion-exchange layered silicate having the following features 1 and 2:

feature 1: in a pore size distribution curve calculated from desorption isotherm by nitrogen adsorption-desorption method, a pore diameter Dm showing a maximum peak intensity $D_{VM}$ is from 60 to 200 Å; and feature 2: in a pore size distribution curve calculated from desorption isotherm by nitrogen adsorption-desorption method, a pore diameter $D_{m1/2}$ (Å) on the smaller pore size side corresponding to a ½ peak intensity of the maximum peak intensity $D_{VM}$ has a relation of $D_{m1/2}/D_m$ of at least 0.65 and less than 1, provided that the largest value is employed when there are a plurality of $D_{m1/2}$ values.

2. The catalyst component for olefin polymerization according to claim 1, the ion-exchange layered silicate further has the following feature 3:

feature 3: the ion-exchange layered silicate has an average crushing strength of at least 3 MPa as measured by a minute compression tester.

3. The catalyst component for olefin polymerization according to claim 1, wherein the ion-exchange layered silicate is treated with an organic aluminum compound having an alkyl group having at least 4 carbon atoms.

4. The catalyst component for olefin polymerization according to claim 1, wherein the ion-exchange layered silicate is obtained by the following steps 1 and 2:

step 1: after granulating, the ion-exchange layered silicate is treated with an acid having an acid concentration (N) satisfying the following formula (I), $$N \geq 6.0 \qquad \text{(Formula I)}$$

wherein the acid concentration N is expressed by acid mol number×acid valence number/acid aqueous solution volume (unit: liter); and step 2: after the above step 1, the ion-exchange layered silicate is treated with an organic aluminum compound having an alkyl group having at least 4 carbon atoms.

5. The catalyst component for olefin polymerization claim 1, wherein the ion-exchange layered silicate is a smectite group silicate.

6. A catalyst for olefin polymerization having the following features 3 and 4, which is formed into a prepolymerization catalyst by contacting a metallocene catalyst supported on an ion-exchange layered silicate with olefin:

feature 3: the ion-exchange layered silicate has an average crushing strength of at least 3 MPa as measured by a minute compression tester; and feature 4: a prepolymerization homogenization index (H-Value) obtained from fluorescent observation results of each of catalyst particles before prepolymerization and after the prepolymerization is at most 60%.

7. The catalyst for olefin polymerization according to claim 6, wherein an ion-exchange layered silicate having the following features 1 and 2 is present:

feature 1: in a pore size distribution curve calculated from desorption isotherm by nitrogen adsorption-desorption method, a pore diameter $D_m$ showing a maximum peak intensity $D_{VM}$ is from 60 to 200 Å; and feature 2: in a pore size distribution curve calculated from desorption isotherm by nitrogen adsorption-desorption method, a pore diameter $D_{m1/2}$ (Å) on the smaller pore size side corresponding to a ½ peak intensity of the maximum peak intensity $D_{VM}$ has a relation of $D_{m1/2}D_m$ of at least 0.65 and less than 1, provided that the largest value is employed when there are a plurality of $D_{m1/2}$ values.

8. A catalyst for olefin polymerization, which is a prepolymerization catalyst obtained by contacting a metallocene catalyst supported on an ion-exchange layered silicate with olefin, wherein (b) a polymer-forming rate is maintained at most 10 mg/min per 1 g of the ion-exchange layered silicate (a) until a prepolymerization polymer is formed in an amount corresponding to a pore volume of the ion-exchange layered silicate.

9. A catalyst for olefin polymerization which is a prepolymerization catalyst obtained by contacting a metallocene catalyst supported on an ion-exchange layered silicate as defined in claim 1 with olefin, wherein (b) a polymer-forming rate is maintained at most 10 mg/min per 1 g of the ion-exchange layered silicate (a) until a prepolymerization polymer is formed in an amount corresponding to a pore volume of the ion-exchange layered silicate.

10. A catalyst for olefin polymerization, which is a prepolymerization catalyst obtained by contacting a metallocene catalyst supported on an ion-exchange layered silicate as defined in claim 1 with olefin, wherein (a) a new metallocene complex and (b) an organic aluminum compound optionally used are contacted with (c) a metallocene catalyst supported on the ion-exchange layered silicate, provided that the metallocene complex (a) may be the same or different from the metallocene complex already supported.

11. A catalyst for olefin polymerization, which is a prepolymerization catalyst obtained by contacting a metallocene catalyst supported on an ion-exchange layered silicate as defined in claim 1 with olefin, wherein (a) the ion-exchange layered silicate is contacted with a metallocene complex for at least 30 minutes, (b) a material obtained by the above contact operation (a) is washed with a slurry of a liquefied α-olefin or inner inert hydrocarbon solvent, and (c) olefin prepolymerization is carried out by using a material obtained by the above washing operation (b).

12. A process for producing polyolefin, which comprises polymerizing olefin by using a catalyst comprising a metallocene compound and a catalyst component for olefin polymerization as defined in claim 1.

13. A process for producing polyolefin, which comprises polymerizing olefin by using a catalyst for olefin polymerization as defined in claim 6.

14. A process for producing polyolefin, which comprises polymerizing olefin by using a catalyst for olefin polymerization as defined in claim 8.

* * * * *